US006845090B1

(12) United States Patent
Takabatake et al.

(10) Patent No.: US 6,845,090 B1
(45) Date of Patent: Jan. 18, 2005

(54) RADIO COMMUNICATION SYSTEM AND RADIO TERMINAL DEVICE USING FASTER AND SLOWER RADIO NETWORKS COOPERATIVELY

(75) Inventors: Yoshiaki Takabatake, Kanagawa (JP); Kiyoshi Toshimitsu, Kanagawa (JP); Yuzo Tamada, Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/541,889

(22) Filed: Mar. 31, 2000

(30) Foreign Application Priority Data

Mar. 31, 1999 (JP) .......................................... P11-094206

(51) Int. Cl.[7] ................................................. H04Q 7/24
(52) U.S. Cl. ....................... 370/338; 370/341; 709/231; 725/74; 725/81; 725/120; 725/123
(58) Field of Search ................................. 370/310, 328, 370/329, 338, 341, 343, 480; 455/3.05, 561, 422, 426; 709/213, 217, 227, 231; 725/62, 63, 64, 65, 74, 78, 81, 109, 121, 123

(56) References Cited

U.S. PATENT DOCUMENTS 5,706,428 A * 1/1998 Boer et al. ................... 370/342
6,484,028 B2 * 11/2002 Okada et al. ................ 455/428

FOREIGN PATENT DOCUMENTS

| EP | 0 766 426 | 4/1997 |
|---|---|---|
| EP | 0 766 490 | 4/1997 |
| WO | WO 99/09691 | 2/1999 |
| WO | WO 99/14897 | 3/1999 |

* cited by examiner

Primary Examiner—Huy D. Vu
Assistant Examiner—Thomas E. Volper
(74) Attorney, Agent, or Firm—Foley & Lardner LLP

(57) ABSTRACT

A communication system including a first terminal device connected to first and second networks, having only a reception function with respect to the first network and transmission and reception functions with respect to the second network, the first network being a radio network according to IEEE 802.11 and the second network being a radio network slower than the first network, and a second terminal device connected to the first and second networks, having at least a transmission function with respect to the first network and transmission and reception functions with respect to the second network is disclosed. In this communication system, the first terminal device carries out a prescribed procedure required in using the first terminal as a receiving side in the first network, by carrying out communications with the second terminal device through the second network, the second terminal device transmits a prescribed information to the first network on behalf of the first terminal device, the prescribed information being an information required to be transmitted to the first network in order for the first terminal device to receive packets through the first network, and the first terminal device receives the packets through the first network.

2 Claims, 18 Drawing Sheets

FIG. 7

| RADIO TERMINAL | 2.4G RADIO LAN MAC ADDRESS | 5G RADIO LAN MAC ADDRESS |
|---|---|---|
| RADIO TERMINAL 101 | X1 | X2 |
| RADIO TERMINAL 102 | Y1 | Y2 |
| RADIO TERMINAL 103 | — | Z |
| ⋮ | | |

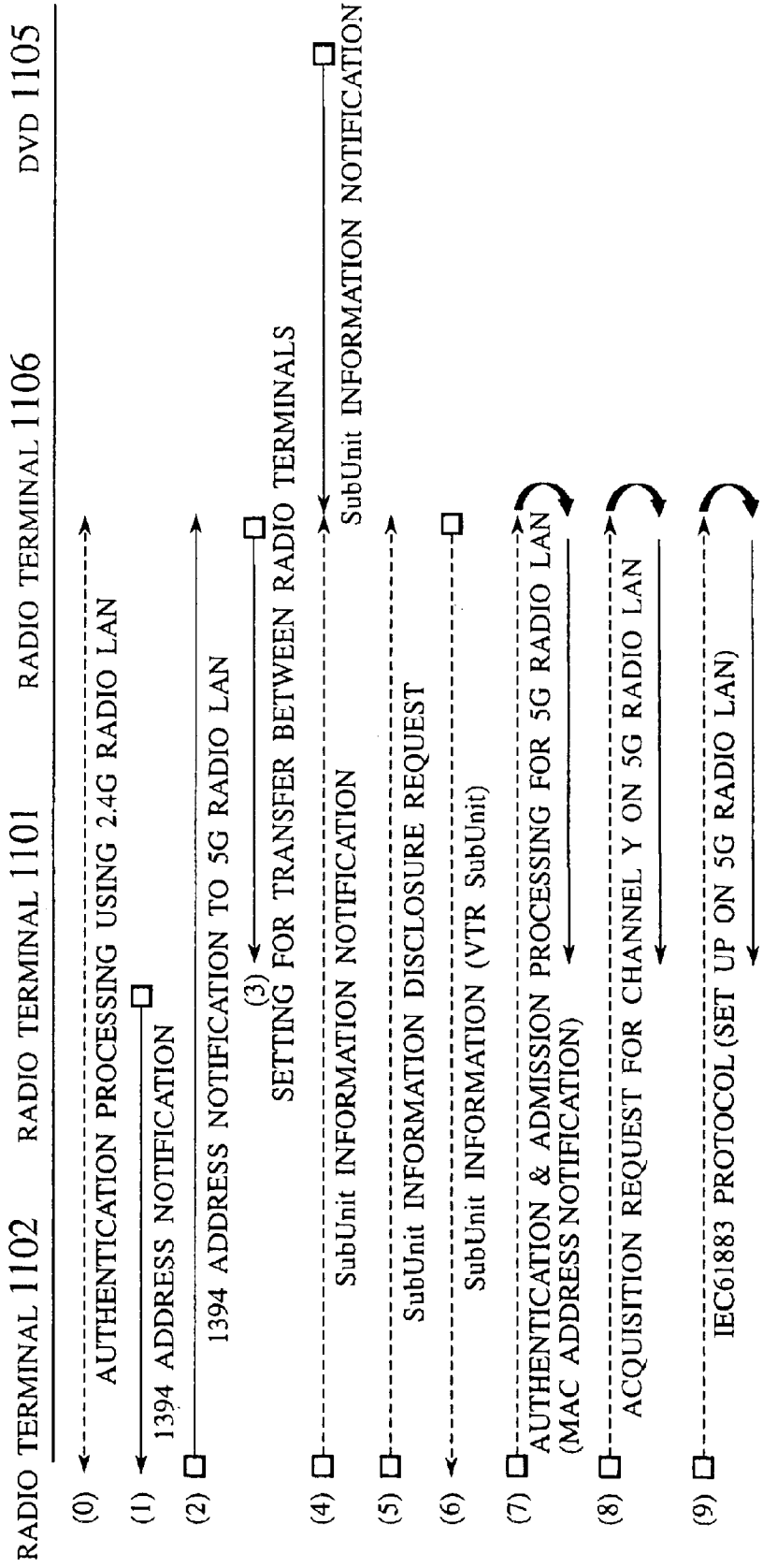

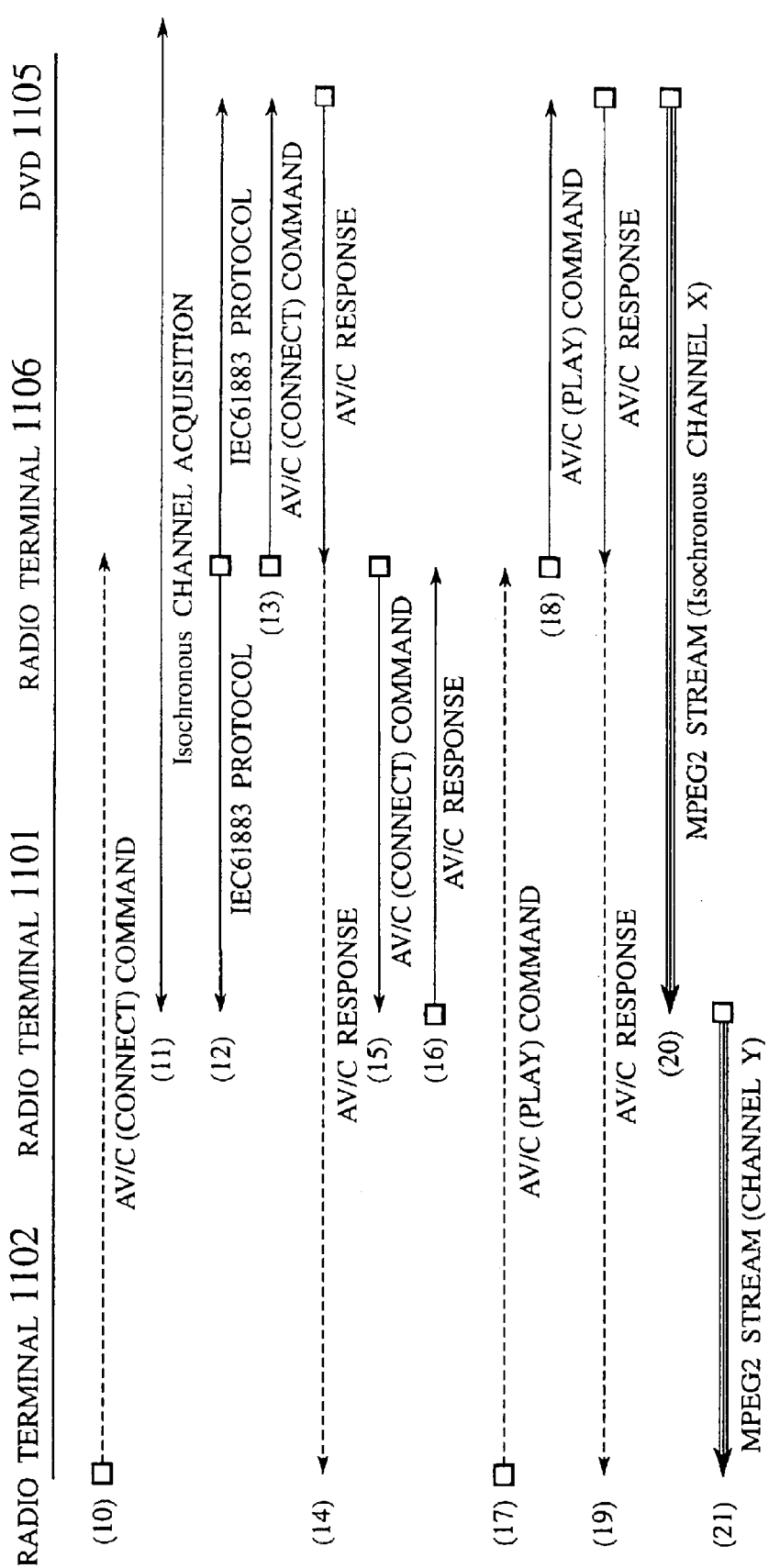

RADIO COMMUNICATION SYSTEM AND RADIO TERMINAL DEVICE USING FASTER AND SLOWER RADIO NETWORKS COOPERATIVELY

BACKGROUND OF THE INVENTION

1. Field of the Invention

The present invention relates to a radio terminal device (which is also referred to as a wireless terminal device) having a plurality of communication interfaces and a radio communication system (which is also referred to as a wireless communication system) including such radio terminal devices.

2. Description of the Background Art

In recent years, the realization of home network is attracting much attention, and in particular, the IEEE 1394 for connecting between digital home electronic devices has been attracting considerable attention. The IEEE 1394 bus is capable of connecting a plurality of terminals in daisy chain or star connection and transferring a wideband data in excess of 100 Mbps. Also, it has a major feature that it is possible to transmit both asynchronous data and isochronous data on the same cable. For this reason, even though the IEEE 1394 bus was originally developed as a next generation version of SCSI, there are increasing trends to use the IEEE 1394 bus as a cable for connecting AV devices.

On the other hand, the realization of fast radio network (radio LAN) is also attracting attention. In particular, since the determination of the IEEE 802.11 specification in 1998, many radio LAN products are appearing in the market and there has been a remarkable decrease in the prices of these radio LAN products.

In conjunction with this trend for improved performance and reduced cost of the radio technology, there is an active trend to consider applications of the radio technology to the home environment and this trend is expected to grow further in future as can be anticipated by establishment of organizations such as HomeRF and Bluetooth in the U.S.A. Also, from a viewpoint of the home network, the radio system is an easily acceptable system as it does not require any new cable construction. For this reason, the fast radio LAN system is expected to play a central role in the future home network.

However, there are some outstanding problems in the application of a radio network to the home environment. One such problem is the realization of a wideband data transfer using radio. Data to be transferred in the home are expected to be mostly video data such as those of TV broadcast or satellite broadcast, so that the realization of a radio system capable of transferring such wideband data is crucial for wider spread of radio systems in the home environment.

To this end, a radio system using 5 GHz band is currently proposed. This proposition is aimed at the realization of a radio system capable of realizing the transmission rate of about 20 to 30 Mbps, by which several channels of MPEG2 video data can be transferred. Also, the 5 GHz band radio frequencies are said to be the last frequencies that can penetrate through many walls present in the home environment, so that this is the most promising candidate for the wideband radio system for home use.

But the 5 GHz band radio system also has its own problems. Namely, it is currently impossible to realize LSI of the RF function using CMOS. This is a severe drawback in view of a low cost realization of the 5 GHz radio system, and its resolution is imperative since it is expected that wider spread of radio systems in the home environment critically depends on how cheaply this 5 GHz band radio system can be offered to the general users.

As described, a radio device for transferring wideband data such as 5 GHz band radio system is expected to be rather expensive, and for this reason it is expected that a cost of the radio terminal itself will be very high in realizing the video data delivery in the home environment. This is a very serious problem for very cost sensitive products such as home electronic devices.

SUMMARY OF THE INVENTION

It is therefore an object of the present invention to provide a communication system and a terminal device using first and second networks, where the terminal device can receive data transfers as a receiving node in the first network, even when the terminal device has a first network interface through which only reception is possible and a second network interface through which both transmission and reception are possible.

More specifically, it is an object of the present invention to provide a radio communication system and a radio terminal device using 2.4 GHz band radio network and 5 GHz band radio network, for example, where the radio terminal device only has a reception function for the 5 GHz band radio network but is still capable of carrying out the authentication/admission processing in the 5 GHz band radio network and/or the AV control protocol processing with respect to a node on the IEEE 1394 bus by utilizing the 2.4 GHz band radio network, while carrying out the actual data transfer using the 5 GHz band radio network.

According to one aspect of the present invention there is provided a communication system, comprising: a first terminal device connected to first and second networks, having only a reception function with respect to the first network and transmission and reception functions with respect to the second network, the first network being a radio network according to IEEE 802.11 and the second network being a radio network slower than the first network; and a second terminal device connected to the first and second networks, having at least a transmission function with respect to the first network and transmission and reception functions with respect to the second network; wherein the first terminal device carries out a prescribed procedure required in using the first terminal as a receiving side in the first network, by carrying out communications with the second terminal device through the second network; the second terminal device transmits a prescribed information to the first network on behalf of the first terminal device, the prescribed information being an information required to be transmitted to the first network in order for the first terminal device to receive packets through the first network; and the first terminal device receives the packets through the first network.

According to another aspect of the present invention there is provided a terminal device, comprising: a first interface configured to carry out at least a packet transmission with respect to a first network which is a radio network according to IEEE 802.11; a second interface configured to carry out packet transmission and reception with respect to a second network which is a radio network slower than the first network; and a control unit configured to carry out communications with another terminal through the second interface so as to carry out a prescribed procedure required in using the another terminal as a receiving side in the first network, and transmit a prescribed information to the first network on behalf of the another terminal, the prescribed information being an information required to be transmitted to the first network in order for the another terminal to receive packets through the first network, such that the another terminal can receive the packets through the first network.

According to another aspect of the present invention there is provided a terminal device, comprising: a first interface configured to carry out at least a packet reception with respect to a first network which is a radio network according to IEEE 802.11; a second interface configured to carry out packet transmission and reception with respect to a second network which is a radio network slower than the first network; and a control unit configured to carry out communications with another terminal through the second interface so as to carry out a prescribed procedure required in using own terminal as a receiving side in the first network, such that the another terminal transmits a prescribed information to the first network on behalf of the own terminal, the prescribed information being an information required to be transmitted to the first network in order for the own terminal to receive packets through the first network, and receive the packets through the first network.

According to another aspect of the present invention there is provided a communication system, comprising: a first terminal device connected to first and second networks, having only a reception function with respect to the first network and transmission and reception functions with respect to the second network, the first network being a radio network according to IEEE 802.11 and the second network being a radio network slower than the first network; a second terminal device connected to the first network and a third network different from the first and second networks, having at least a transmission function with respect to the first network and transmission and reception functions with respect to the third network; a third terminal device connected to the second and third networks, having transmission and reception functions with respect to the second and third networks; and a fourth device provided on the third network, having transmission and reception functions with respect to the third networks; wherein the first terminal device carries out a prescribed procedure required in using the first terminal as a receiving side in the first network, by carrying out communications with the third terminal device through the second network; the third terminal device carries out the prescribed procedure by carrying out communications with the second terminal device through the third network; the third terminal device carries out another prescribed procedure required in relaying packets transferred from the fourth device towards the first terminal device at the second terminal device, by transferring a control information received from the first terminal device through the first network, to the second terminal device through the third network; the first terminal device transmits a packet transmission request with respect to the fourth device, to the third terminal device through the second network; the third terminal device transfers the packet transmission request received from the first terminal device, to the fourth device through the third network; the fourth device transmits packets in response to the packet transmission request received from the third terminal device, to the second terminal device through the third network; and the second terminal device transfers the packets received from the fourth device, to the first terminal device through the first network.

According to another aspect of the present invention there is provided a terminal device for carrying out a data transfer with respect to a first terminal through a first network, under a control of a second terminal; the first terminal having only a reception function with respect to the first network and transmission and reception functions with respect to a second network, the first network being a radio network according to IEEE 802.11 and the second network being a radio network slower than the first network, the second terminal being connected to the second network and a third network different from the first and second networks and having transmission and reception functions with respect to the second and third networks, the terminal device comprising: a first interface configured to carry out at least a packet transmission with respect to the first network; a second interface configured to carry out packet transmission and reception with respect to the third network; and a control unit configured to receive a control information transferred from the second terminal through the third network, and transfer packets received from a third device provided on the third network, to the first terminal through the first network according to the control information.

According to another aspect of the present invention there is provided a terminal device for controlling a data transfer with respect to a first terminal through a first network from a second terminal, the first terminal having only a reception function with respect to the first network w and transmission and reception functions with respect to a second network, the first network being a radio network according to IEEE 802.11 and the second network being a radio network slower than the first network, the second terminal being connected to the first network and a third network different from the first and second networks and having at least a transmission function with respect to the first network and transmission and reception functions with respect to the third network, the terminal device comprising: a first interface configured to carry out packet transmission and reception with respect to the second network; a second interface configured to carry out packet transmission and reception with respect to the third network; and a control unit configured to carry out communications with the first terminal through the first interface and communications with the second terminal through the second interface, so as to carry out a prescribed procedure required in using the first terminal as a receiving side in the first network, carry out another prescribed procedure required in relaying packets transferred from a third device provided on the third network towards the first terminal at the second terminal by transferring a control information received from the first terminal through the first network to the second terminal through the third network, and transfer the packet transmission request received from the first terminal through the second network to the third device through the third network.

According to another aspect of the present invention there is provided a terminal device for receiving a data transfer through a first network from a first terminal by utilizing a second terminal through a second network, the first network being a radio network according to IEEE 802.11 and the second network being a radio network slower than the first network, the first terminal being connected to the first network and a third network different from the first and second networks and having at least a transmission function with respect to the first network and transmission and reception functions with respect to the third network, and the second terminal being connected to the second network and the third network and having transmission and reception functions with respect to the second and third networks, the terminal device comprising: a first interface configured to carry out at least a packet reception with respect to a first network which is a radio network according to IEEE 802.11; a second interface configured to carry out packet transmission and reception with respect to a second network which is a radio network slower than the first network; and a control unit configured to carry out communications with the second terminal through the second interface so as to carry out a prescribed procedure required in using own terminal as a receiving side in the first network, transmit a packet transmission request with respect to a third device provided on the third network to the second terminal through the second network, and receive packets transmitted from the third device in response to the packet transmission request and relayed by the first terminal through the first network.

According to another aspect of the present invention there is provided a method of packet transfer in a communication system including a first terminal device connected to first and second networks, having only a reception function with respect to the first network and transmission and reception functions with respect to the second network, the first network being a radio network according to IEEE 802.11 and the second network being a radio network slower than the first network, and a second terminal device connected to the first and second networks, having at least a transmission function with respect to the first network and transmission and reception functions with respect to the second network, the method comprising the steps of: carrying out a prescribed procedure required in using the first terminal as a receiving side in the first network, by carrying out communications between the first terminal device and the second terminal device through the second network; transmitting a prescribed information from the second terminal device to the first network on behalf of the first terminal device, the prescribed information being an information required to be transmitted to the first network in order for the first terminal device to receive packets through the first network; and receiving the packets at the first terminal device through the first network.

According to another aspect of the present invention there is provided a method of packet transfer in a communication system including a first terminal device connected to first and second networks, having only a reception function with respect to the first network and transmission and reception functions with respect to the second network, the first network being a radio network according to IEEE 802.11 and the second network being a radio network slower than the first network, a second terminal device connected to the first network and a third network different from the first and second networks, having at least a transmission function with respect to the first network and transmission and reception functions with respect to the third network, a third terminal device connected to the second and third networks, having transmission and reception functions with respect to the second and third networks, and a fourth device provided on the third network., having transmission and reception functions with respect to the third networks, the method comprising the steps of: carrying out a prescribed procedure required in using the first terminal as a receiving side in the first network, by carrying out communications between the first terminal device and the third terminal device through the second network; carrying out the prescribed procedure by carrying out communications between the third terminal device and the second terminal device through the third network; carrying out another prescribed procedure required in relaying packets transferred from the fourth device towards the first terminal device at the second terminal device, by transferring a control information received from the first terminal device through the first network, from the third terminal device to the second terminal device through the third network; transmitting a packet transmission request with respect to the fourth device, from the first terminal device to the third terminal device through the second network; transferring the packet transmission request received from the first terminal device, from the third terminal device to the fourth device through the third network; transmitting packets in response to the packet transmission request received from the third terminal device, from the fourth device to the second terminal device through the third network: and transferring the packets received from the fourth device, from the second terminal device to the first terminal device through the first network.

Other features and advantages of the present invention will become apparent from the following description taken in conjunction with the accompanying drawings.

BRIEF DESCRIPTION OF THE DRAWINGS

FIG. 7 is a diagram showing a MAC address correspondence table that can be used in the network system of FIG. 1.

FIG. 17 is a diagram showing a first half of a processing sequence for communications among radio terminals in the network system of FIG. 16.

FIG. 18 is a diagram showing a second half of a processing sequence for communications among radio terminals in the network system of FIG. 16.

DETAILED DESCRIPTION OF THE PREFERRED EMBODIMENTS

In the following, the preferred embodiments of the present invention will be described with references to the drawings. In the first to fourth embodiments described below, an exemplary case of a radio system in a home network of a home will be described, where this radio system can use a faster (assumed to be 5 GHz band) radio LAN as a first network and a slower (assumed to be 2.4 GHz band) radio LAN, and define a unidirectional downlink on the faster radio LAN. Among these, the third and fourth embodiments are specifically directed to the case where the IEEE 1394 bus can be used as a third network in addition.

Referring now to FIG. 1 to FIG. 7, the first embodiment of a radio communication system and a radio terminal device according to the present invention will be described in detail.

This first embodiment is directed to a scheme by which a radio terminal having only a reception function with respect to the 5 GHz band radio LAN (or capable of utilizing only a reception function with respect to the 5 GHz band radio LAN) carries out a processing (such as authentication/admission processing, for example) with respect to the 5 GHz band radio LAN, via the 2.4 GHz band radio LAN.

Figure 1:
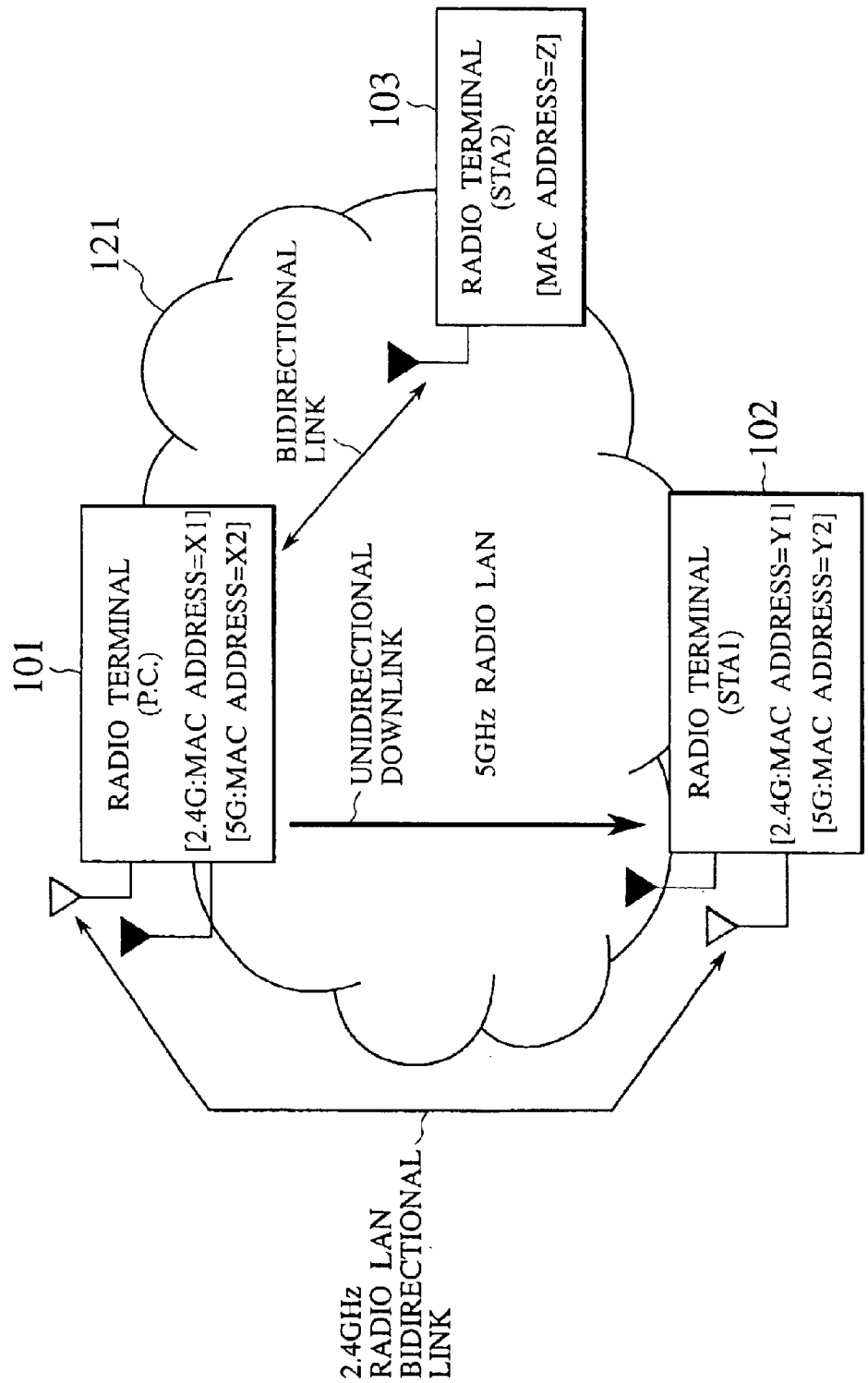
FIG. 1 is a schematic diagram showing a configuration of a network system according to the first embodiment of the present invention.

FIG. 1 shows an exemplary configuration of a network system in which the 5 GHz band radio LAN and the 2.4 GHz band radio LAN are used cooperatively. These radio LANs are both operated according to the IEEE 802.11 protocol, but uses different radio frequencies so that there is no interference between them.

The network system of FIG. 1 includes a radio terminal 101 which provides a P.C. (Point Coordinator) function in the 5 GHz band radio LAN 121, a radio terminal 103 which has transmission and reception functions with respect to the 5 GHz band radio LAN, and a radio terminal 102 which has only a reception function with respect to the 5 GHz band radio LAN. In addition, the radio terminal 101 and the radio terminal 102 have transmission and reception functions with respect to the 2.4 GHz band radio LAN by which they can communicate with each other.

Note that the following description is directed to an exemplary ease in which each of the radio terminal 101 and the radio terminal 102 has a MAC address on the 2.4 GHz band radio LAN and a MAC address on the 5 GHz band radio LAN separately, but it is also possible to use the same MAC address for the MAC address on the 2.4 GHz band radio LAN and the MAC address on the 5 GHz band radio LAN. In the following, it is assumed that the radio terminal 101 has an address "X1" on the 2.4 GHz band radio LAN and an address "X2" on the 5 GHz band radio LAN, the radio terminal 102 has an address "Y1" on the 2.4 GHz band radio LAN and an address "Y2" on the 5 GHz band radio LAN, and the radio terminal 103 has an address "Z" on the 5 GHz band radio LAN.

According to the IEEE 802.11 protocol, when one radio terminal carries out a communication with a desired correspondent radio terminal, a radio terminal authentication processing should be carried out between these radio terminal prior to the communication. Also, when one radio terminal makes a connection to a desired radio LAN, a radio LAN admission processing should be carried out between the radio terminal and the P.C. (the radio terminal 101 in the case of FIG. 1) as a processing for making the connection. In the configuration of FIG. 1, the radio terminal 102 has only a reception function with respect to the 5 GHz band radio LAN, so that this radio terminal 102 cannot directly carry out the authentication/admission processing using the 5 GHz band radio frequencies at a time of carrying out a communication with another radio terminal (the radio terminal 101 or the radio terminal 103, for example).

In this embodiment, the radio terminal 102 having only a reception function with respect to the 5 GHz band radio LAN carries out the authentication/admission processing with respect to the 5 GHz band radio LAN, via the 2.4 GHz band radio LAN.

In order to carry out the authentication processing according to the IEEE 802.11, it is necessary for both terminals to notify each other an authentication algorithm that is executable on the own terminal as well as the MAC address of the own terminal. For this reason, in order for the radio terminal 102 that has only a reception function with respect to the 5 GHz band radio LAN to carry out the authentication processing with another radio terminal in the 5 GHz band radio LAN, there is a need to notify the information necessary for the authentication processing (the executable authentication algorithm and the MAC address) using a different route. In FIG. 1, the 2.4 GHz band radio LAN is utilized for this purpose. Similarly, in the case where the radio terminal 102 makes a connection to the radio terminal 101 which is the P.C. of the 5 GHz band radio LAN, there is a need for the radio terminal 102 to notify the MAC address of the own terminal to the radio terminal 101, and in FIG. 1, the 2.4 GHz band radio LAN is also utilized for this purpose.

Figure 2:
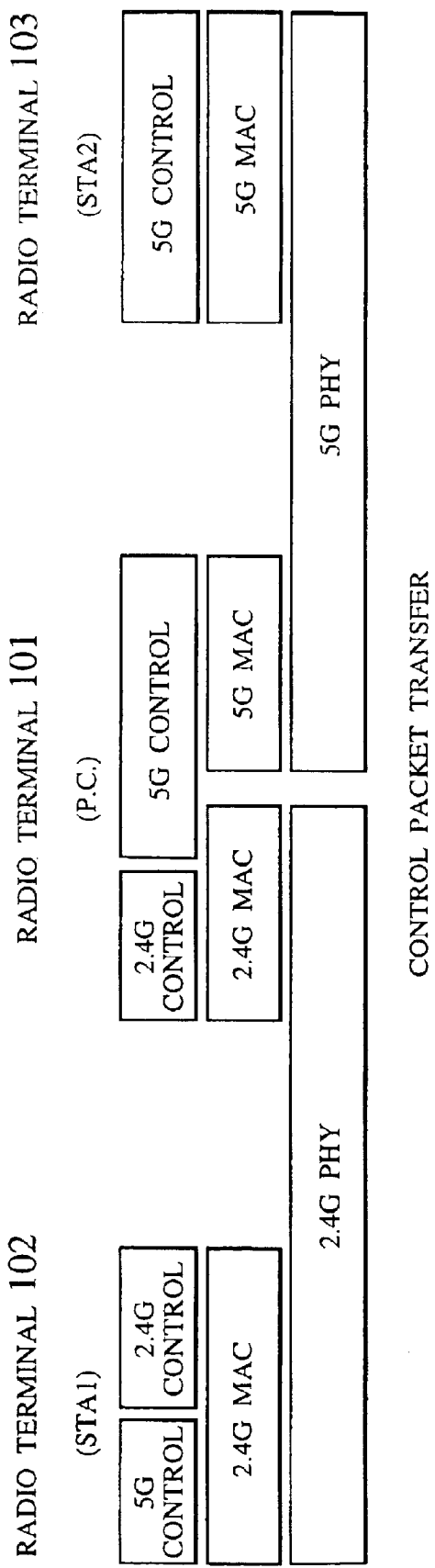
FIG. 2 is a diagram showing a protocol stack for a control packet transfer protocol used in the network system of FIG. 1.

FIG. 2 shows a protocol stack indicating how the authentication/admission processing is carried out between the radio terminal 101 and the radio terminal 103 in this case. In FIG. 2, the authentication/admission processing with respect to the 5 GHz band radio LAN is abbreviated as "5 G control", and the authentication/admission processing with respect to the 2.4 GHz band radio LAN is abbreviated as "2.4 G control". As can be seen from FIG. 2, in this 5 embodiment, the authentication/admission processing of the radio terminal 102 with respect to the 5 GHz band radio LAN is carried out at the radio terminal 101 which is the P.C. of the 5 GHz band radio LAN, via the 2.4 GHz band radio LAN. On the other hand, between the radio terminal 101 and the radio terminal 103 which has both transmission and reception functions with respect to the 5 GHz band radio LAN, the authentication/admission processing with respect to the 5 GHz band radio LAN is carried out via the 5 GHz band radio LAN.

Figure 3:
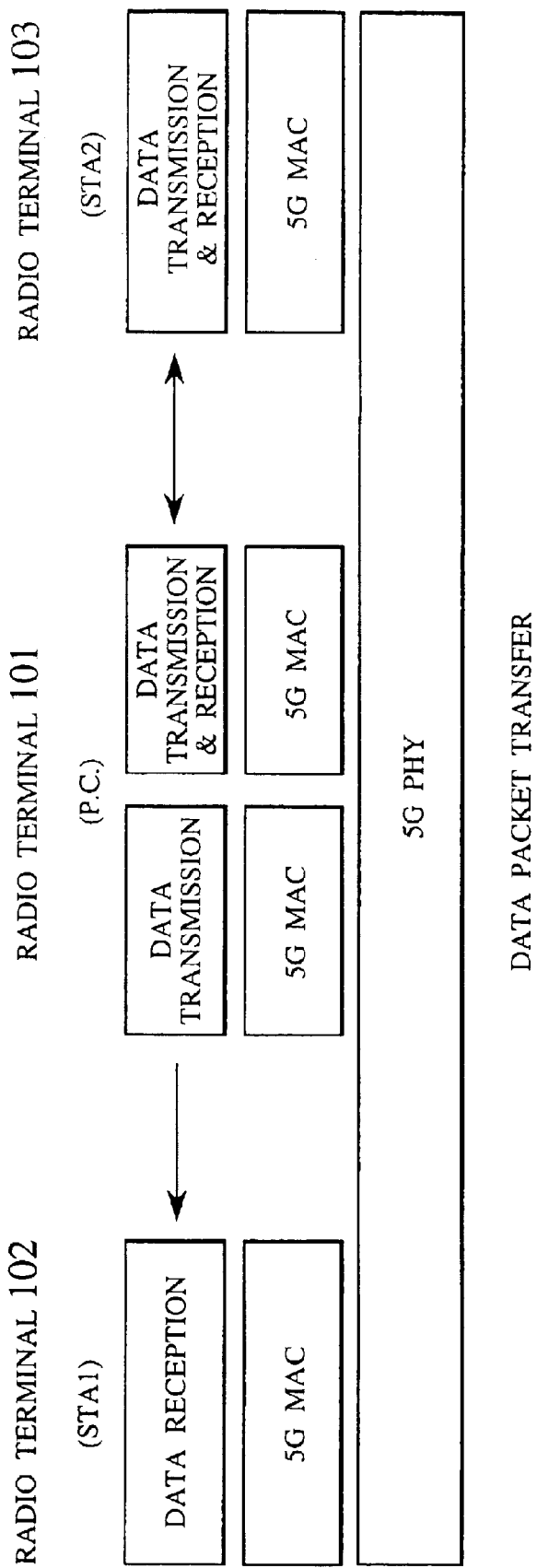
FIG. 3 is a diagram showing a protocol stack for a data packet transfer protocol used in the network system of FIG. 1.

FIG. 3 shows a protocol stack indicating how the actual data transfer is carried out between the radio terminal 101 and the radio terminal 102, as well as between the radio terminal 101 and the radio terminal 103. As can be seen from FIG. 3, the actual data are transferred via the 5 GHz band radio LAN, but only data transmitted from the radio terminal 101 towards the radio terminal 102; will be transferred to the radio terminal 102.

In the case of carrying out the authentication/admission processing on the 5 GHz band radio LAN via the 2.4 GHz band radio LAN and transferring the actual data via the 5 GHz band radio LAN, a packet identification method on the 2.4 GHz band radio LAN must be devised. Namely, it is necessary to specify which layer should be used by the radio terminal 101 in order to identify a packet on which the control information for the 5 GHz band radio LAN is loaded among the packets received at an interface with respect to the 2.4 GHz band radio LAN.

Two examples for this packet identification processing and the actual data transfer processing will now be described with references to FIG. 4 and FIG. 5.

Figure 4:
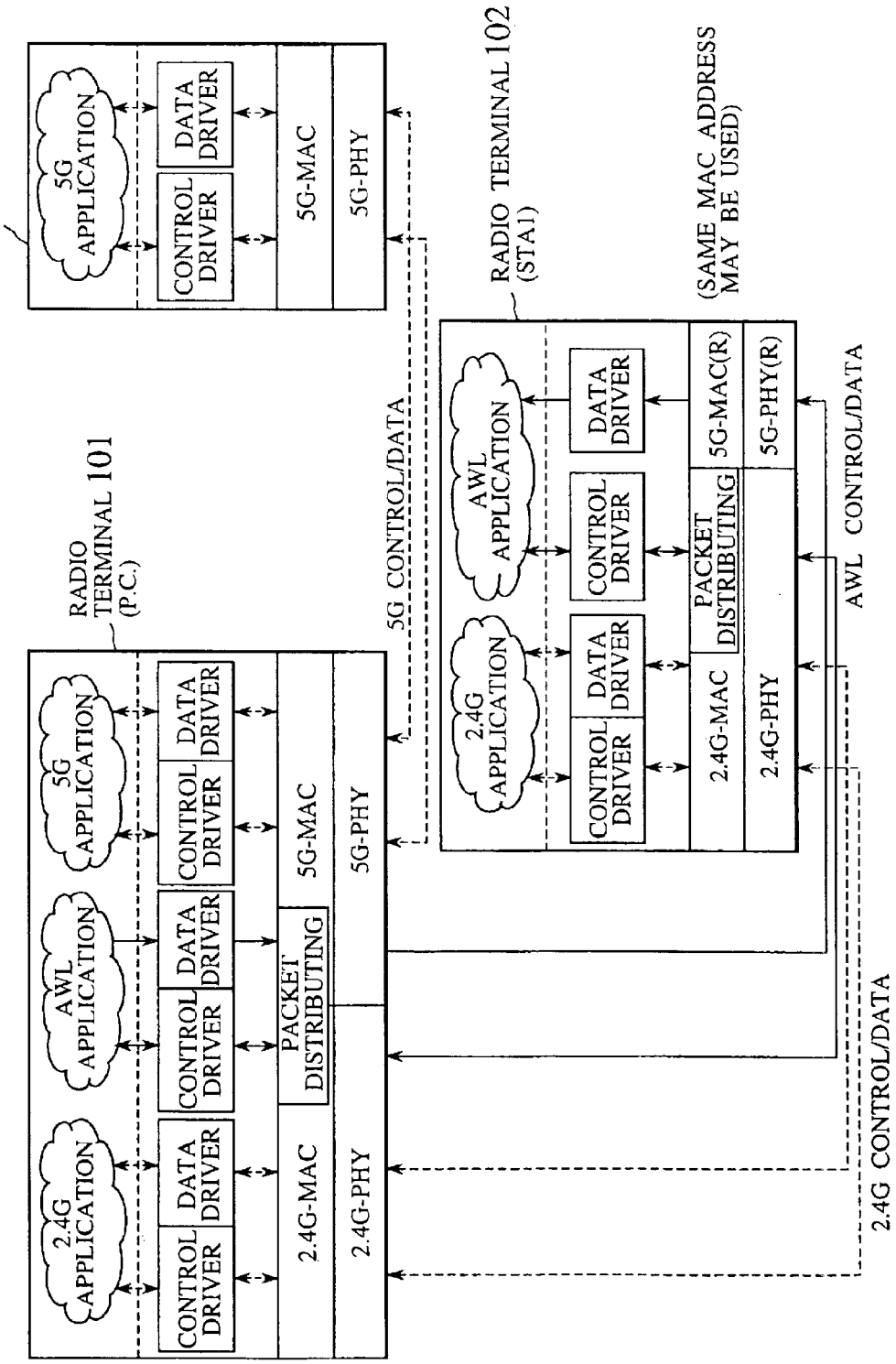
FIG. 4 is a block diagram for explaining one exemplary processing for packet transfer among radio terminals in the network system of FIG. 1.
Figure 5:
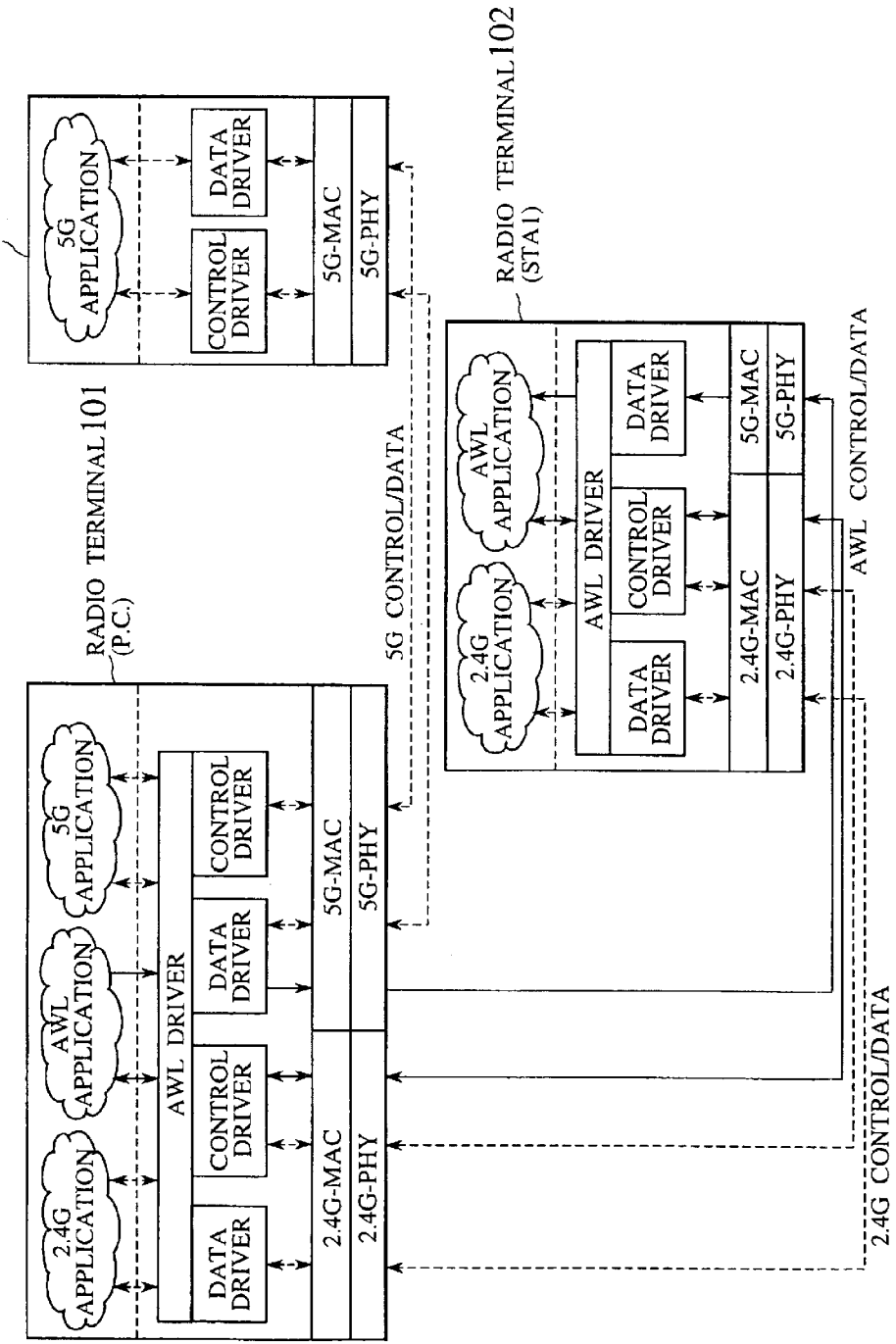
FIG. 5 is a block diagram for explaining another exemplary processing for packet transfer among radio terminals in the network system of FIG. 1.

FIG. 4 and FIG. 5 show various drivers operating on each MAC layer, in addition to the physical and MAC layers of the 2.4 GHz band radio LAN and the 5 GHz band radio LAN (denoted in the figures as 2.4 G-PHY, 2.4 G-MAC, 5G-PHY, and 5 G-MAC respectively). Here, control drivers for handling the authentication/admission, the data transfer request, etc., and data drivers for handling the actual data transfer are distinguished.

FIG. 4 and FIG. 5 also show various applications to be executed using these drivers, including an ordinary application to be executed on the 2.4 GHz band radio LAN (abbreviated as 2.4 G application in the figures), an ordinary application to be executed on the 5 GHz band radio LAN (abbreviated as 5 G application in the figures), and an AWL (Asymmetric Wireless Link) application in which the control information is exchanged via the 2.4 GHz band radio LAN and the actual data are transferred on the 5 GHz band radio LAN.

In FIG. 4 and FIG. 5, a dotted line indicates a packet transfer route in the case of executing the ordinary application on the 2.4 GHz band radio LAN, a dashed line indicates a packet transfer route in the case of executing the ordinary application on the 5 GHz band radio LAN, and a solid line indicates a packet transfer route in the case of executing the AWL application. In both FIG. 4 and FIG. 5, the radio terminal 103 is an ordinary terminal on the 5 GHz band radio LAN so that the processing according to the ordinary (IEEE 802.11) protocol of the 5 GHz band radio LAN is carried out between the radio terminal 101 and the radio terminal 103.

Now a concrete processing for the control packet transfer and the data packet transfer in the case of executing the AWL application between the radio terminal 101 and the radio terminal 102 will be described.

First, the case of using the exemplary configuration of FIG. 4 will be described.

After receiving a packet at a physical layer processing unit (2.4 G-PHY in FIG. 4) for the 2.4 GHz band radio LAN, the radio terminal 101 carries out the "packet distributing" processing for identifying whether the received packet is a packet corresponding to the application on the 2.4 GHz band radio LAN or a packet corresponding to the AWL application at a MAC layer processing unit (2.4 G-MAC in FIG. 4) which is an upper layer processing unit of the physical layer processing unit. A "packet distributing" processing unit is provided in the MAC layer processing unit for this purpose.

In order to identify a packet on the MAC layer in this way, there is a need to define a flag indicating that the information corresponding to the AWL application is loaded in that packet, within a MPDU (MAC Protocol Data Unit) that is defined as a packet for the MAC layer processing in the IEEE 802.11. By checking presence/absence of such a flag, the MAC layer processing unit for that 2.4 GHz band radio LAN judges whether the received packet should be w transferred to the control driver of the AWL application or to the control driver of the ordinary 2.4 GHz application.

Also, data to be transmitted from the AWL application on the radio terminal 101 towards the radio terminal 102 are transferred to the "packet distributing" processing unit within the MAC layer processing unit (5 G-MAC in FIG. 4) for the 5 GHz band radio LAN via its data driver. Here, the fact that this data packet is transmitted from the AWL application is indicated by a flag on the MPDU, and then the packet transmission processing is carried out according to a packet transmission algorithm using a unidirectional downlink from the radio terminal 101 to the radio terminal 102. If it is possible to carry out the unidirectional packet transfer processing from the radio terminal 101 to the radio terminal 102 without changing the ordinary MAC algorithm on the 5 GHz band radio LAN, the "packet distributing" processing unit within the MAC layer processing unit for the 5 GHz band radio LAN will be unnecessary.

Next, the processing in the case of executing the AWL application at the radio terminal 102 will be described.

In the case where the radio terminal 102 executes the AWL application on the own terminal, the control processing necessary for it is carried out on the 2.4 GHz band radio LAN. For this reason, a packet carrying the control information that is transmitted from the AWL application is transferred to the "packet distributing" processing unit within the MAC layer processing unit (2.4 G-MAC in FIG. 4) for the 2.4 GHz band radio LAN via the control driver of the AWL application. Here, the fact that this packet is a control packet for executing the AWL application is indicated by a flag on the MPDU, and then this packet is transferred to the radio terminal 101 via the MAC/physical layer processing units for the 2.4 GHz band radio LAN.

Also, the radio terminal 102 has only a reception function (5 G-PHY(R), 5 G-MAC(R) in FIG. 4) with respect to the 5 GHz band radio LAN, and is capable of executing only the AWL application using this function. The radio terminal 102 receives only data packets of the AWL application from the 5 GHz band radio LAN. Thus packets received at an interface with respect to the 5 GHz band radio LAN of the radio terminal 102 are all to be transferred to the AWL application, so that all the packets from the MAC layer processing unit for the 5 GHz band radio LAN will be transferred to the data driver of the AWL application, and the "packet distributing" processing as used in the radio terminal 101 is unnecessary in the radio terminal 102.

As described here, the radio terminal 102 executes only the packet reception processing with respect to the 5 GHz band radio LAN so that the execution of the AWL application between the radio terminal 101 and the radio terminal 102 is possible even when the same MAC address is used as the MAC address on the 2.4 GHz band radio LAN and the MAC address on the 5 GHz band radio LAN of the radio terminal 102. In such a case, it is necessary for the "packet distributing" processing unit of the radio terminal 101 to recognize in advance that the MAC address on the 2.4 GHz band radio LAN and the MAC address on the 5 GHz band radio LAN of the radio terminal 102 are the same.

Next, the case of using the exemplary configuration of FIG. 5 will be described.

First, the processing in the case of executing the AWL application at the radio terminal 101 will be described.

In FIG. 5, unlike FIG. 4, no new function is added to the MAC layer processing for each radio LAN in the radio terminal 101 and the radio terminal 102, and whether the received packet is a packet for the application on the 2.4 GHz band or 5 GHz band radio LAN or a packet for the AWL application is identified at an upper level driver of the MAC layer.

First, the radio terminal 101 transfers a packet received by the physical layer processing unit (2.4 G-PHY in FIG. 5) and the MAC layer processing unit (2.4 G-MAC in FIG. 5) for the 2.4 GHz band radio LAN, to the corresponding control driver. Then, the MPDU header is removed from the packet received from the MAC layer processing unit, and the information on internal data is checked. Here, a field for identifying that the information corresponding to the AWL application is loaded on this packet is defined as one of the information on internal data, and whether the received packet is a packet corresponding to the AWL application or not is judged according to this field. This packet identification processing is carried out by the AWL driver defined as an upper level driver of the control and data drivers in FIG. 5.

Also, data transmitted from the AWL application on the radio terminal 101 towards the radio terminal 102 are transferred as follows. Namely, a packet on which this data is loaded is transferred to the AWL driver at which the information indicating that this is a packet corresponding to the AWL application is attached to this packet, and this packet is transferred to the lower level data driver. Then, this packet with the above information attached is transferred to the radio terminal 102 via the MAC/physical layer processing units for the 5 GHz band radio LAN through the unidirectional downlink. Here, in FIG. 5, it is assumed that the unidirectional packet transfer processing from the radio terminal 101 to the radio terminal 102 can be executed without modifying the ordinary MAC algorithm on the 5 GHz band radio LAN, but if some processing for the purpose of carrying out the unidirectional packet transfer processing is required, a function for executing that processing will be provided in the MAC layer processing unit for the 5 GHz band radio LAN.

Next, the processing in the case of executing the AWL application at the radio terminal 102 will be described.

In the case of executing the AWL application on the own terminal, the radio terminal 102 executes the control processing necessary for that purpose on the 2.4 GHz band radio LAN. For this reason, the control packet transmitted from the AWL application is attached with an indication that this packet is a packet corresponding to the AWL application at the AWL driver, and then transferred to the radio terminal 101 via its control driver and the MAC/physical layer processing units for the 2.4 GHz band radio LAN.

Also, the radio terminal 102 has only a reception function (5 G-PHY(R), 5 G-MAC(R) in FIG. 5) with respect to the 5 GHz band radio LAN, and is capable of executing only the AWL application using this function. The radio terminal 102 receives only data packets of the AWL application from the 5 GHz band radio LAN. Thus packets received at an interface with respect to the 5 GHz band radio LAN of the radio terminal 102 are all to be transferred to the AWL application, so that all the packets from the MAC layer processing unit for the 5 GHz band radio LAN will be transferred to the data driver of the AWL application.

The execution of the AWL application between the radio terminal 101 and the radio terminal 102 can be realized using this scheme.

Figure 6:
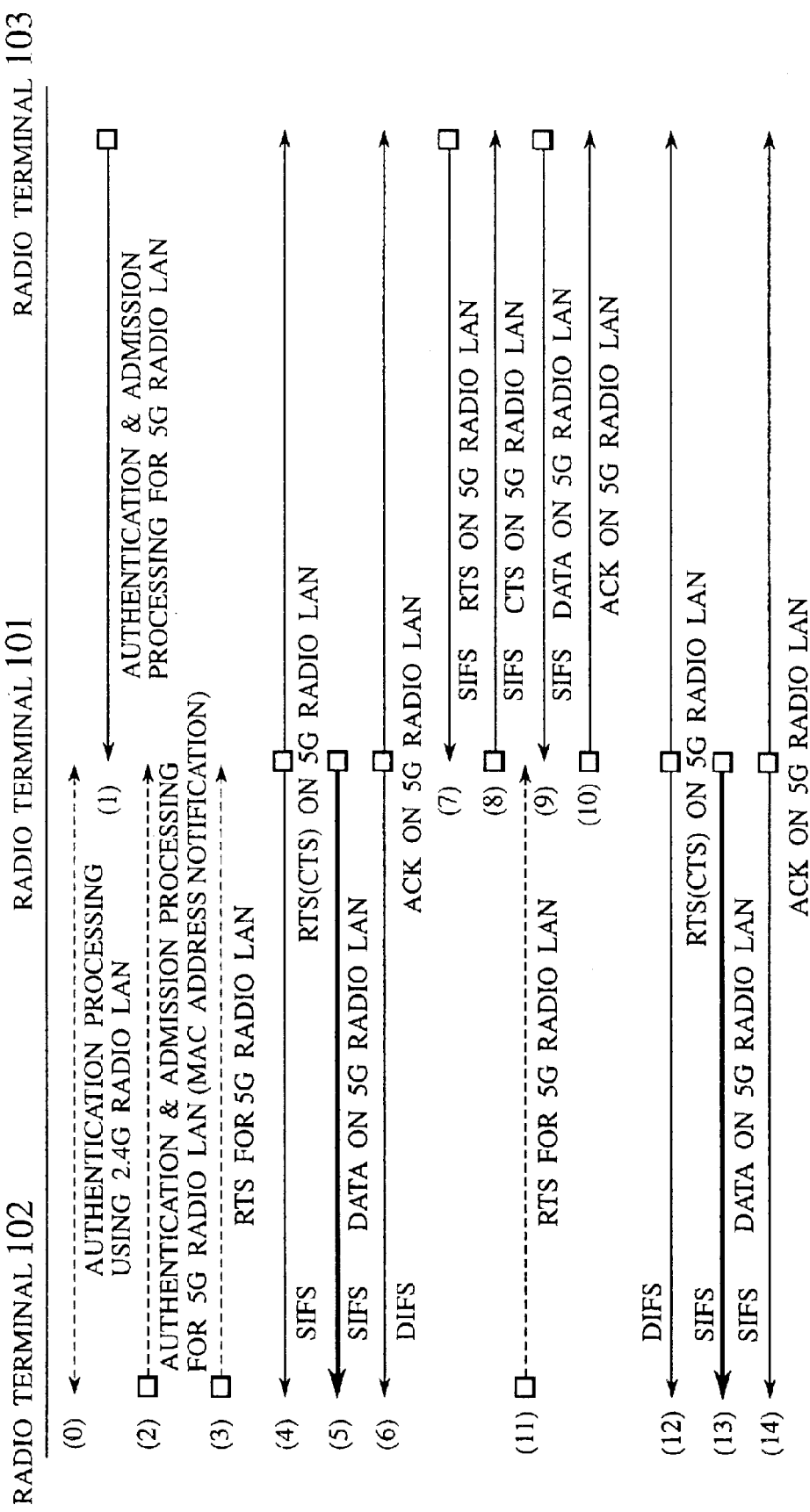
FIG. 6 is a diagram showing a processing sequence for communications among radio terminals in the network system of FIG. 1.

FIG. 6 shows an exemplary processing sequence at a time of actually transferring data from the radio terminal 101 to the radio terminal 102 in the radio network operated in this scheme. Here, it is assumed that the data transfer processing is carried out by the Contention Mode of the IEEE 802.11 as the transfer protocol on the radio LANs, and the carrier sense processing is carried out prior to a series of data transfer processing from each radio terminal. This processing sequence proceeds as follows.

(0) The radio terminal 102 carries out the authentication processing with the radio terminal 101, and becomes a state in which communications using the 2.4 GHz band radio LAN are possible.

(1) The radio terminal 103 carries out the authentication processing with the radio terminal 101, and then makes a connection to the 5 GHz band radio LAN for which the radio terminal 101 is the P.C., via the 5 GHz band radio LAN.

(2) The radio terminal 102 carries out the authentication processing for the 5 GHz band radio LAN with the radio terminal 101, via the 2.4 GHz band radio LAN, and then makes a connection to the 5 GHz band radio LAN for which the radio terminal 101 is the P.C.

Here, the radio terminal 102 notifies its own MAC address (=Y2) on the 5 GHz band radio LAN to the radio terminal 101 via the 2.4 GHz band radio LAN. As a result, the radio terminal 101 memorizes that the MAC address (=Y1) on the 2.4 GHz band radio LAN corresponds to the MAC address (=Y2) on the 5 GHz band radio LAN.

(3) The radio terminal 102 transmits a request indicating the data transfer from the radio terminal 101 to the radio terminal 102 via the 5 GHz band radio LAN, to the radio terminal 101 via the 2.4 GHz band radio LAN.

Here, the radio terminal 102 may issue an RTS request for the 5 GHz band radio LAN by using an RTS (Request to Send) packet on the 2.4 GHz band radio LAN, or define a packet for transferring control information for the 5 GHz band radio LAN on the 2.4 GHz band radio LAN and issue the RTS request by using this packet.

(4) The radio terminal 101 transmits the RTS packet on the 5 GHz band radio LAN on behalf of the radio terminal 102 according to the request of (3), so as to reserve media.

Here, the radio terminal 101 may reserve media by transmitting a CTS (Clear to Send) packet corresponding to this RTS packet, on the 5 GHz band radio LAN.

(5) The radio terminal 101 transmits a packet towards the radio terminal 102.

(6) The radio terminal 101 transmits an Ack packet corresponding to the packet transmitted by the processing of (5), on the 5 GHz band radio LAN on behalf of the radio terminal 102.

Here, a packet transmission interval in the series of packet transmissions from (4) to (6) is the SIFS interval which is the minimum packet transmission interval specified in the IEEE 802.11.

(7) The radio terminal 103 transmits the RTS packet on the 5 GHz band radio LAN, so as to reserve media for the data transfer from the radio terminal 103 to the radio terminal 101 (the carrier sense processing is carried out prior to this RTS packet transmission).

(8) The radio terminal 101 transmits the CTS packet corresponding to the RTS packet of (7) on the 5 GHz band radio LAN, so as to reserve media.

(9) The radio terminal 103 transmits a packet towards the radio terminal 101.

(10) The radio terminal 101 transmits an Ack packet corresponding to the packet transmitted by the processing of (9), to the radio terminal 103.

Here, a packet transmission interval in the series of packet transmissions from (7) to (10) is also the SIFS interval which is the minimum packet transmission interval specified in the IEEE 802.11.

(11) While the processing from (7) to (10) is carried out, the radio terminal 102 transmits another request indicating the data transfer from the radio terminal 101 to the radio terminal 102 via the 5 GHz band radio LAN, to the radio terminal 101 via the 2.4 GHz band radio LAN (the processing as (3)).

(12) The radio terminal 101 transmits the RTS packet w on the 5 GHz band radio LAN on behalf of the radio terminal 102 according to the request of (11), so as to reserve media.

Here, the radio terminal 101 may reserve media by transmitting a CTS (Clear to Send) packet corresponding to this RTS packet, on the 5 GHz band radio LAN.

(13) The radio terminal 101 transmits a packet towards the radio terminal 102.

(14) The radio terminal 101 transmits an Ack packet corresponding to the packet transmitted by the processing of (13), on the 5 GHz band radio LAN on behalf of the radio terminal 102.

Here, a packet transmission interval in the series of packet transmissions from (12) to (14) is also the SIFS interval which is the minimum packet transmission interval specified in the IEEE 802.11.

By this series of processing, even the radio terminal 102 which has only a reception function with respect to the 5 GHz band radio LAN can receive data from the 5 GHz band radio LAN without affecting the radio terminal 103 that is operated by the ordinary radio LAN protocol, so that it becomes possible to provide a unidirectional data downloading service on the radio LAN operated by the protocol such as the IEEE 802.11.

Note that, the above example is directed to the case where the radio terminal 102 uses different addresses for the MAC address on the 2.4 GHz band radio LAN and the MAC address on the 5 GHz band radio LAN, but as already mentioned above, these MAC addresses are not necessarily different and it is also possible to use the same MAC address for the MAC address on the 2.4 GHz band radio LAN and the MAC address on the 5 GHz band radio LAN.

Note also that, in the above processing (2), the radio terminal 101 can store the MAC address correspondence in a correspondence table shown in FIG. 7. In the correspondence table of FIG. 7, the MAC address of each interface of the radio terminal with which the radio terminal 101 can communicate is registered. Using such a correspondence table, it is possible to carry out communications using the 2.4 GHz band radio LAN and the unidirectional downlink on the 5 GHz band radio LAN as described above.

Figure 8:
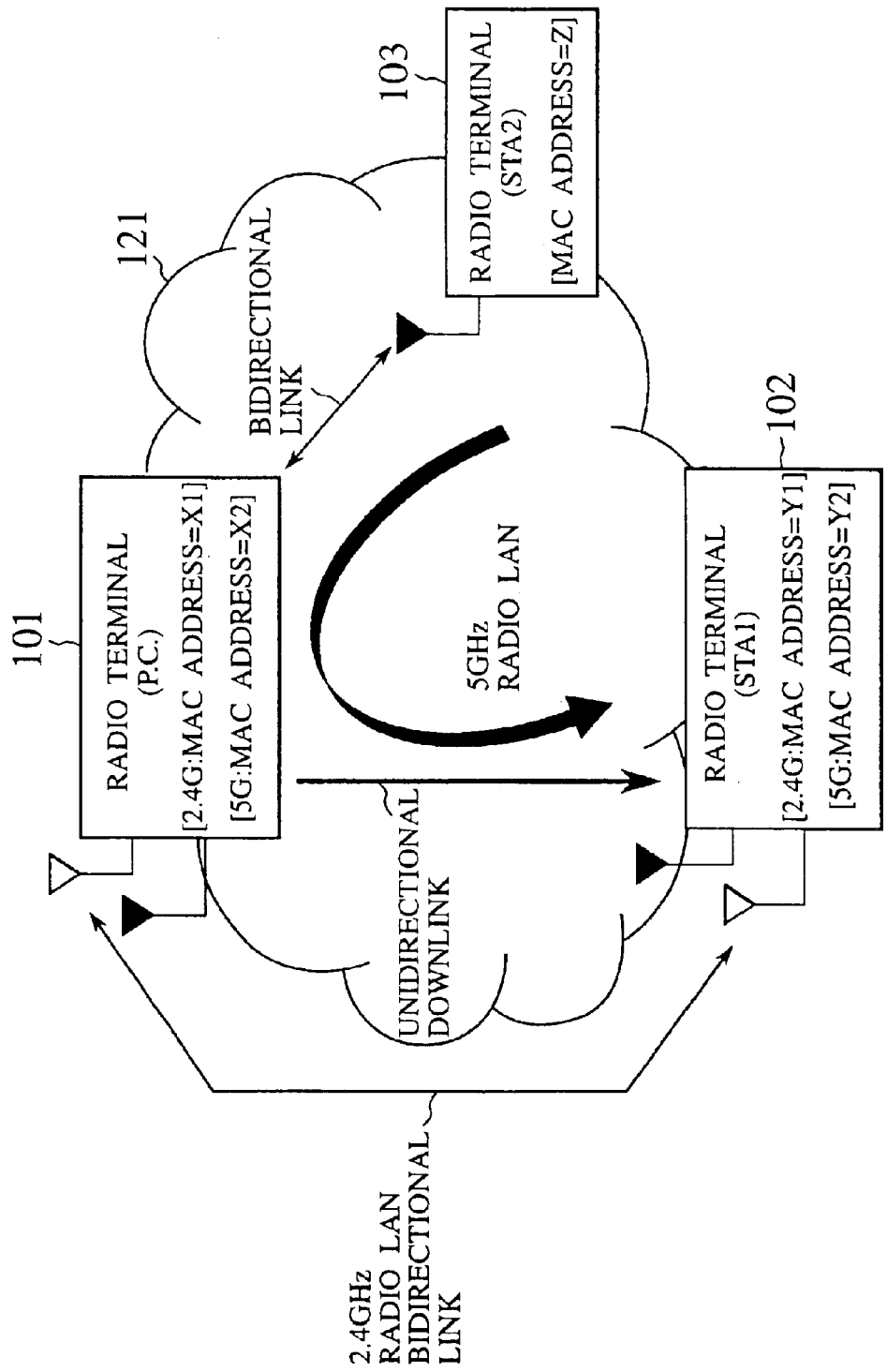
FIG. 8 is a schematic diagram showing a configuration of a network system according to the second embodiment of the present invention.
Figure 9:
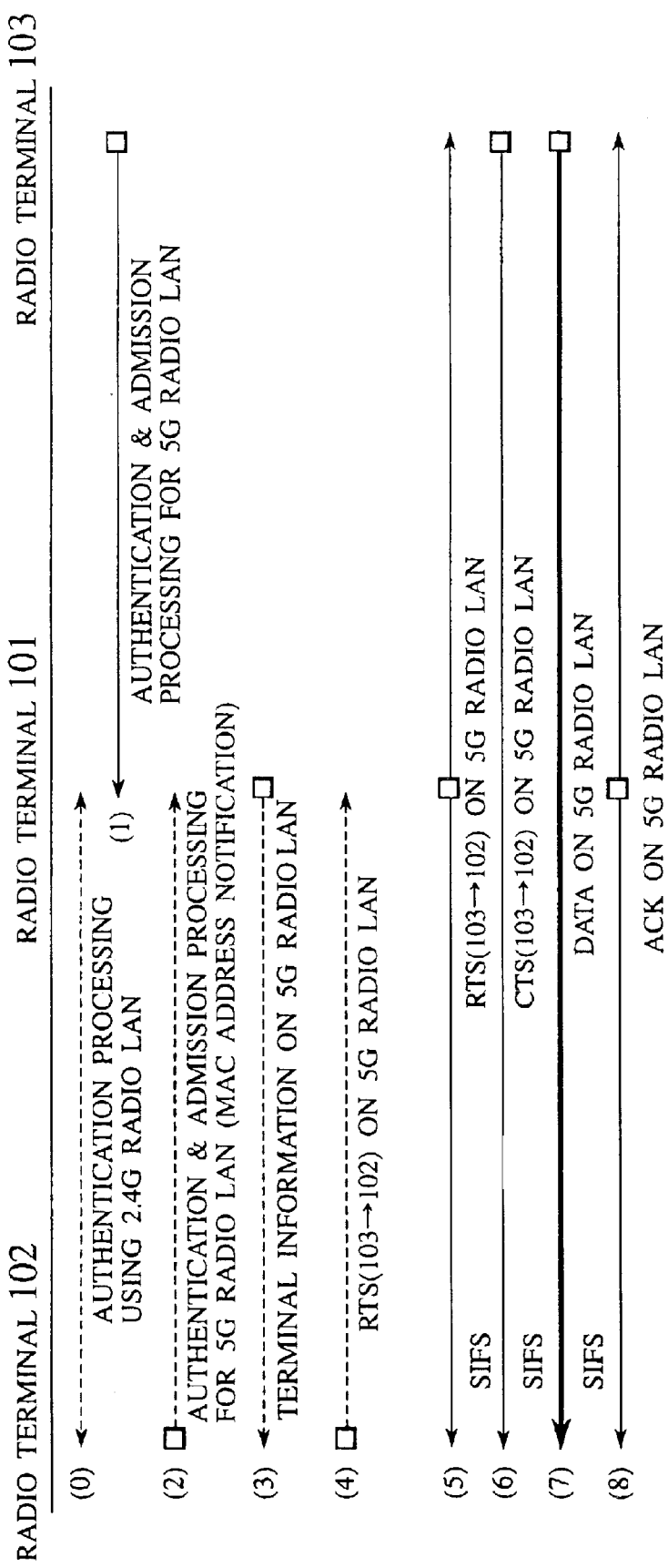
FIG. 9 is a diagram showing a processing sequence for communications among radio terminals in the network system of FIG. 8, in the case of direct packet transfer.
Figure 10:
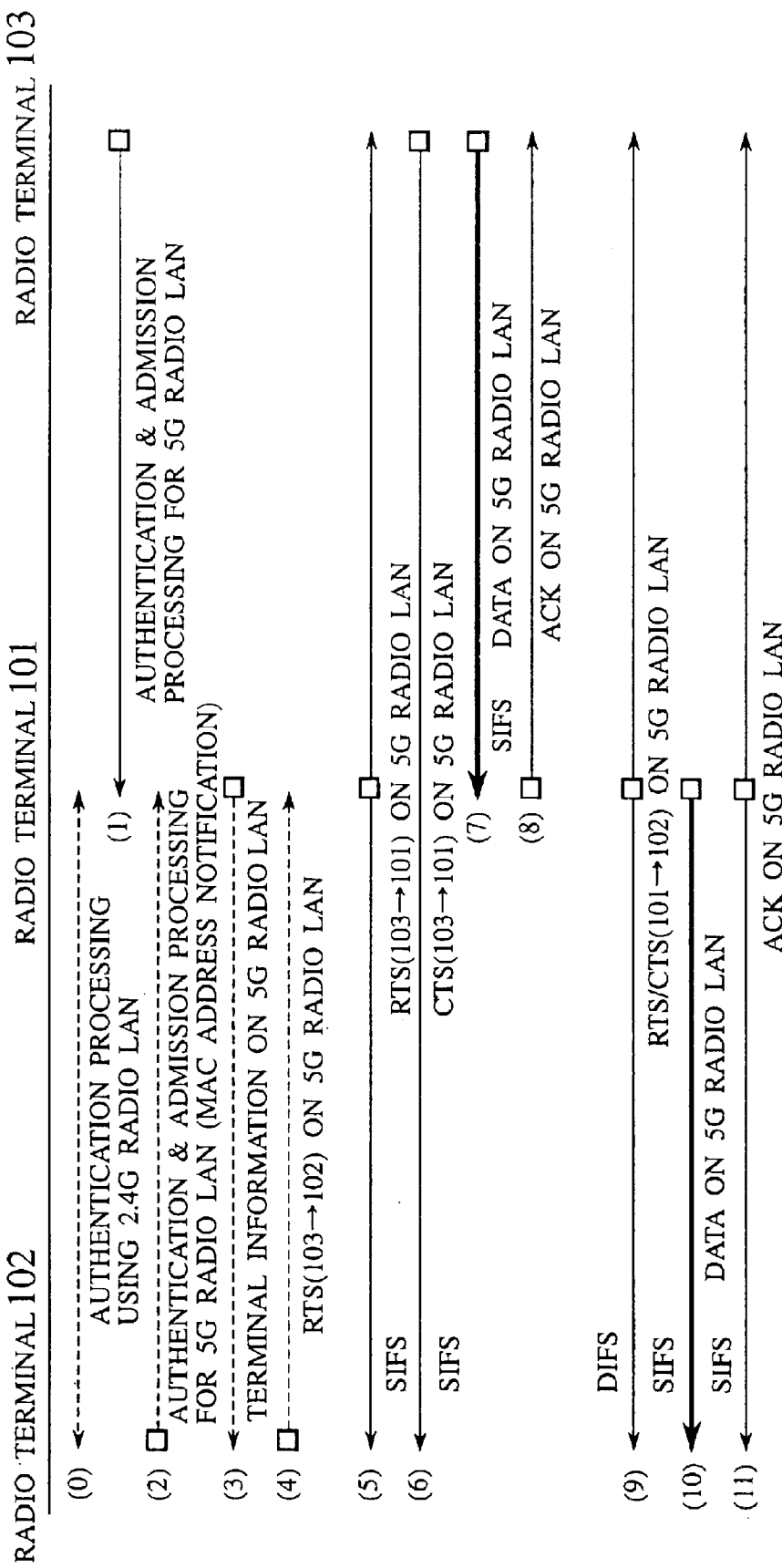
FIG. 10 is a diagram showing a processing sequence for communications among radio terminals in the network system of FIG. 8, in the case of packet transfer relaying.

Referring now to FIG. 8 to FIG. 10, the second embodiment of a radio communication system and a radio terminal device according to the present invention will be described in detail.

In the first embodiment, the data transfer from the radio terminal 101 which is the P.C. to the radio terminal 102 has been described. In this second embodiment, the data transfer from the radio terminal 103 to the radio terminal 102 (in a configuration basically similar to that of the first embodiment) will be described. Also, in this second embodiment, the case of the data transfer from the radio terminal 103 to the radio terminal 102 using the ordinary MAC processing (by the radio terminal 103) and the case of the data transfer from the radio terminal 103 to the radio terminal 102 relayed by the radio terminal 101 which is the P.C. will be described.

FIG. 8 shows a configuration similar to that of the first embodiment, in which the data transfer from the radio terminal 103 to the radio terminal 102 is realized. In this example, it is assumed that the radio terminal 102 can ascertain the MAC address of a terminal existing on the 5 GHz band radio LAN from the framework of the IEEE 802.11, and requests a packet transfer from the radio terminal 103 by ascertaining its MAC address accordingly.

Here, the radio terminal is operated according to the IEEE 802.11 protocol used in the 5 GHz band radio LAN, but the radio terminal 102 is a terminal in which only a reception function with respect to the 5 GHz band radio LAN is provided. Consequently, in this embodiment, there are two cases including the case where the data transfer from the radio terminal 103 to the radio terminal 102 can be realized directly through the 5 GHz band radio LAN and the case where data are transferred from the radio terminal 103 via the radio terminal 101 which has a function for transferring data to the radio terminal 102.

Normally, in the MAC protocol of the IEEE 802.11, if the Ack packet is not returned from a terminal to which a packet is transmitted, a terminal that transmitted the packet will judge that a packet transfer has failed and retransmit the packet. Therefore, in the case of transferring a packet to a terminal like the radio terminal 102 which only has a packet reception function, the same packet would be transmitted many times repeatedly unless some measure to prevent this from happening is provided. As a measure to prevent this from happening, it is possible to provide a processing for ignoring presence/absence of the Ack packet reception at a terminal that transmitted a packet depending on the destination of the packet, or a processing to transmit the Ack packet from a terminal other than the destination terminal of the packet (a source terminal, for example) on behalf of the destination terminal. In the following, it is assumed that a terminal that transmits a packet is a terminal in accordance with the IEEE 802.11 such as the radio terminal 103, so that the former method to ignore the Ack packet cannot be adopted. Consequently, this example is directed to the case of realizing a direct packet transfer from the radio terminal 103 to the radio terminal 102 in which the Ack packet corresponding to a packet transmission from the radio terminal 103 to the radio terminal 102 is transmitted from the radio terminal 101 on behalf of the radio terminal 102.

FIG. 9 shows an exemplary processing sequence in the case of realizing the direct packet transfer from the radio w terminal 103 to the radio terminal 102 using this scheme for transmitting the Ack packet from the radio terminal 101. Here, it is assumed that the data transfer processing is carried out by the Contention Mode of the IEEE 802.11 as the transfer protocol on the 5 GHz band radio LAN. It is also assumed that the radio terminal 102 makes a connection to the 5 GHz band radio LAN using a procedure as described in the first embodiment. This processing sequence proceeds as follows.

(0) The radio terminal 102 carries out the authentication processing with the radio terminal 101, and becomes a state in which communications using the 2.4 GHz band radio LAN are possible.

(1) The radio terminal 103 carries out the authentication processing with the radio terminal 101, and then makes a connection to the 5 GHz band radio LAN for which the radio terminal 101 is the P.C. via the 5 GHz band radio LAN.

(2) The radio terminal 102 carries out the authentication processing for the 5 GHz band radio LAN with the radio terminal 101, via the 2.4 GHz band radio LAN, and then makes a connection to the 5 GHz band radio LAN for which the radio terminal 101 is the P.C.

(3) The radio terminal 101 notifies information on the MAC addresses of the radio terminals existing in the 5 GHz band radio LAN according to the IEEE 802.11 protocol.

(4) The radio terminal 102 transmits a request indicating the data transfer from the radio terminal 103 to the radio terminal 102 via the 5 GHz band radio LAN, to the radio terminal 101 via the 2.4 GHz band radio LAN.

(5) The radio terminal 101 transmits the RTS packet on the 5 GHz band radio LAN on behalf of the radio terminal 102 according to the request of (4), so as to reserve media. At this point, the source terminal of the requested packet is set as the radio terminal 103 and the destination terminal of the requested packet is set as the radio terminal 102.

(6) The radio terminal 103 transmits the CTS packet corresponding to the RTS packet of (5) on the 5 GHz band radio LAN, so as to reserve media.

(7) The radio terminal 103 transmits a packet towards the radio terminal 102.

(8) The radio terminal 101 transmits an Ack packet corresponding to the packet transmitted by the processing of (7), on the 5 GHz band radio LAN on behalf of the radio terminal 102.

Here, a packet transmission interval in the series of packet transmissions from (5) to (8) is the SIFS interval which is the minimum packet transmission interval specified in the IEEE 802.11.

Next, the processing in the case where the direct packet transfer from the radio terminal 103 to the radio terminal 102 is impossible will be described. Here, it is assumed that, in the configuration of FIG. 8, the radio terminal 103 is capable of communicating only with the radio terminal 101, and the radio terminal 102 is capable of receiving packets only from the radio terminal 101. Therefore, in the case of transferring a packet from the radio terminal 103 to the radio terminal 102, it is necessary to relay the packet at the radio terminal 101. This example is directed to the case where the radio terminal 101 that received "a request for packet transfer from the radio terminal 103 to the radio terminal 102" from the radio terminal 102 via the 2.4 GHz band radio LAN will activate two packet transfers including a packet transfer from the radio terminal 103 to the own terminal (radio terminal 101) and a packet transfer from the own terminal (radio terminal 101) to the radio terminal 102.

FIG. 10 shows an exemplary processing sequence in the case of realizing the packet transfer from the radio terminal 103 to the radio terminal 102 using this scheme. Here, it is also assumed that the data transfer processing is carried out by the Contention Mode of the IEEE 802.11 as the transfer protocol on the 5 GHz band radio LAN. It is also assumed that the radio terminal 102 makes a connection to the 5 GHz band radio LAN using a procedure as described in the first embodiment. This processing sequence proceeds as follows.

(0) The radio terminal 102 carries out the authentication processing with the radio terminal 101, and becomes a state in which communications using the 2.4 GHz band radio LAN are possible.

(1) The radio terminal 103 carries out the authentication processing with the radio terminal 101, and then makes a connection to the 5 GHz band radio LAN for which the radio terminal 101 is the P.C., via the 5 GHz band radio LAN.

(2) The radio terminal 102 carries out the authentication processing for the 5 GHz band radio LAN with the radio terminal 101, via the 2.4 GHz band radio LAN, and then makes a connection to the 5 GHz band radio LAN for which the radio terminal 101 is the P.C.

(3) The radio terminal 101 notifies information on the MAC addresses of the radio terminals existing in the 5 GHz band radio LAN according to the IEEE 802.11 protocol.

(4) The radio terminal 102 transmits a request indicating the data transfer from the radio terminal 103 to the radio terminal 102 via the 5 GHz band radio LAN, to the radio terminal 101 via the 2.4 GHz band radio LAN.

(5) The radio terminal 101 transmits the RTS packet on the 5 GHz band radio LAN on behalf of the radio terminal 102 according to the request of (4), so as to reserve media. At this point, the source terminal of the requested packet is set as the radio terminal 103 and the destination terminal of the requested packet is set as the radio terminal 101.

(6) The radio terminal 103 transmits the CTS packet corresponding to the RTS packet of (5) on the 5 GHz band radio LAN, so as to reserve media.

(7) The radio terminal 103 transmits a packet towards the radio terminal 101.

(8) The radio terminal 101 transmits an Ack packet corresponding to the packet transmitted by the processing of (7), on the 5 GHz band radio LAN.

Here, a packet transmission interval in the series of packet transmissions from (5) to (8) is the SIFS interval which is the minimum packet transmission interval specified in the IEEE 802.11.

(9) After a certain period of time (the DIFS Interval, for example) has elapsed, the radio terminal 101 transmits the RTS packet on the 5 GHz band radio LAN on behalf of the radio terminal 102 according to the request of (4) again, so as to reserve media. At this point, the source terminal of the requested packet is set as the radio terminal 101 and the destination terminal of the requested packet is set as the radio terminal 102.

Here, the radio terminal 101 may reserve media by transmitting a CTS packet corresponding to this RTS packet, on the 5 GHz band radio LAN.

(10) The radio terminal 101 transmits the packet received by the processing of (7), towards the radio terminal 101.

(11) The radio terminal 101 transmits an Ack packet corresponding to the packet transmitted by the processing of (10), on the 5 GHz band radio LAN.

Here, a packet transmission interval in the series of packet transmissions from (9) to (11) is the SIFS interval which is the minimum packet transmission interval specified in the IEEE 802.11.

Using this scheme, it becomes possible to realize the packet transfer between the radio terminal in accordance with the specification of the 5 GHz band radio LAN (radio terminal 103) and the radio terminal which has only a reception function with respect to the 5 GHz band radio LAN (radio terminal 102).

Referring now to FIG. 11 to FIG. 15, the third embodiment of a radio communication system and a radio terminal device according to the present invention will be described in detail.

This third embodiment is directed to the case of operating the radio network (using the 2.4 GHz band radio LAN and the 5 GHz band radio LAN) together with the IEEE 1394 bus.

In this embodiment, a radio terminal having a P.C. function which is capable of carrying out communications by both the 2.4 GHz band radio LAN and the 5 GHz band radio LAN is provided on the IEEE 1394 bus, and this radio terminal relays the data transfer to the radio terminal which has (or which is capable of utilizing) only a reception function with respect to the 5 GHz band radio LAN from a device on the IEEE 1394 bus such as a DVD.

The example described here is directed to the case where the radio terminal on the radio network downloads image information from a DVD existing on the IEEE 1394 bus, and in particular the AV control protocol is executed between this radio terminal and the DVD via the 2.4 GHz band radio LAN, and the actual image data are received via the 5 GHz band radio LAN.

Figure 11:
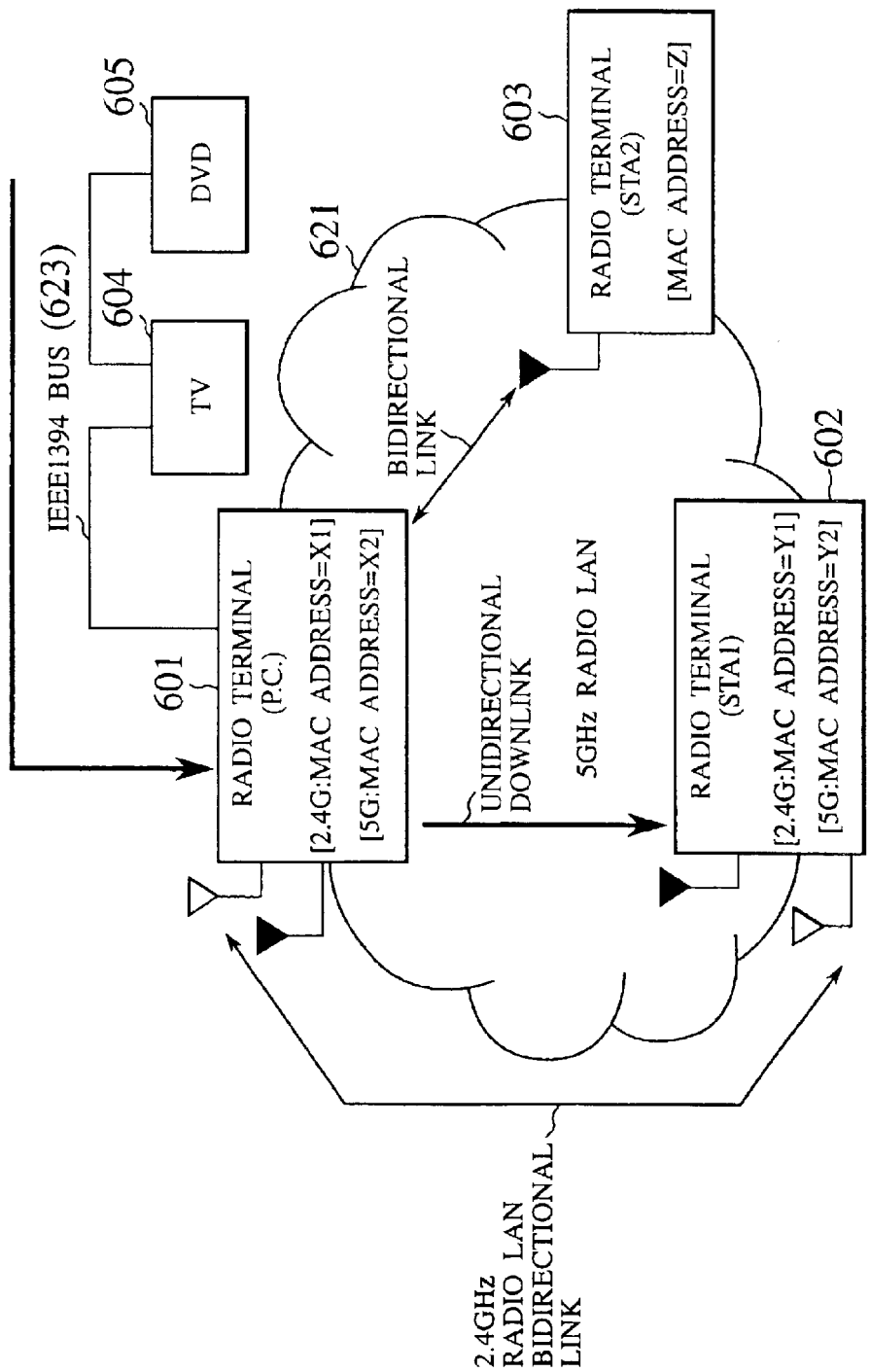
FIG. 11 is a schematic diagram showing a configuration of a network system according to the third embodiment of the present invention.

FIG. 11 shows an exemplary configuration of a network system in this case. It is assumed that the radio LANs are operated according to the IEEE 802.11 protocol similarly as in the first and second embodiments. The network system of FIG. 11 includes a radio terminal 601 which provides a P.C. function in the 5 GHz band radio LAN 621, a radio terminal 603 which has transmission and reception functions with respect to the 5 GHz band radio LAN, and a radio terminal 602 which has only a reception function with respect to the 5 GHz band radio LAN. In addition, the radio terminal 601 and the radio terminal 602 have transmission and reception functions with respect to the 2.4 GHz band radio LAN by which they can communicate with each other. Moreover, the radio terminal 601 has an interface with respect to the IEEE 1394 bus 623, and is connected to a TV 604 and a DVD 605 via the IEEE 1394 bus.

This embodiment is directed to the case where the AV control protocol (AV/C protocol) to be executed between the radio terminal 602 and the DVD 605 is executed via the 2.4 GHz band radio LAN and the IEEE 1394 bus, and as a result the MPEG2 data transmitted from the DVD 605 are transferred to the radio terminal 602 via the IEEE 1394 bus and the 5 GHz band radio LAN.

Here, in the AV/C protocol, 1394 nodes having 1394 interfaces are recognized in units called Unit, and constituent elements (such as a cassette table section or a CD section in an audio component system, for example) within the 1394 terminal are recognized in units called SubUnit. In this embodiment it is assumed that the AV/C protocol is to be executed between the DVD 605 on the IEEE 1394 bus and the radio terminal 602 by recognizing each other at a level of their constituent elements (SubUnits of the AV/C protocol), rather than directly recognizing each other. More specifically, in the case of FIG. 11, the constituent element (SubUnit) in the DVD 605 is recognized from a viewpoint of the radio terminal 602 as if it is existing in the radio terminal 601, while the constituent element (SubUnit) in the radio terminal 602 is recognized from a viewpoint of the DVD 605 on the IEEE 1394 bus as if it is existing in the radio terminal 601.

In the following, the case of transferring the MPEG2 data in the DVD 605 to the radio terminal 602 will be described, assuming that the AV/C protocol is executed between the radio terminal 602 and the DVD 605 based on such a recognition.

Figure 12:
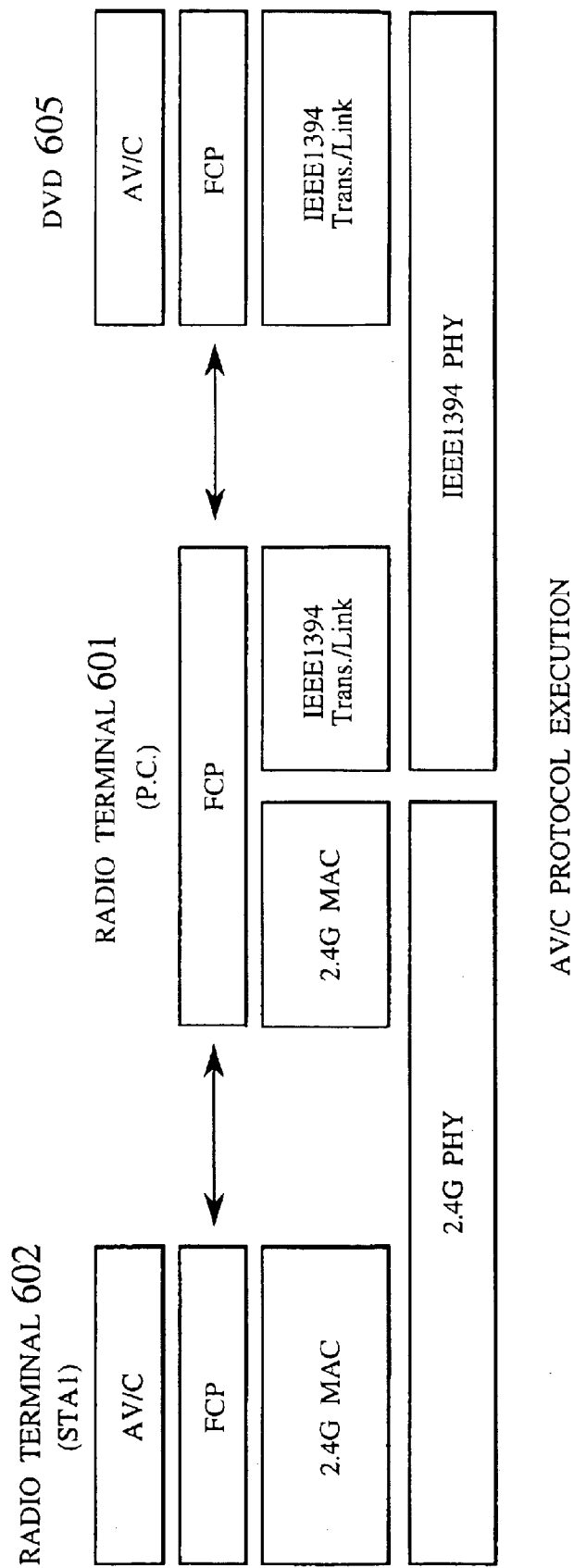
FIG. 12 is a diagram showing a protocol stack for a AV/C protocol execution used in the network system of FIG. 11.
Figure 13:
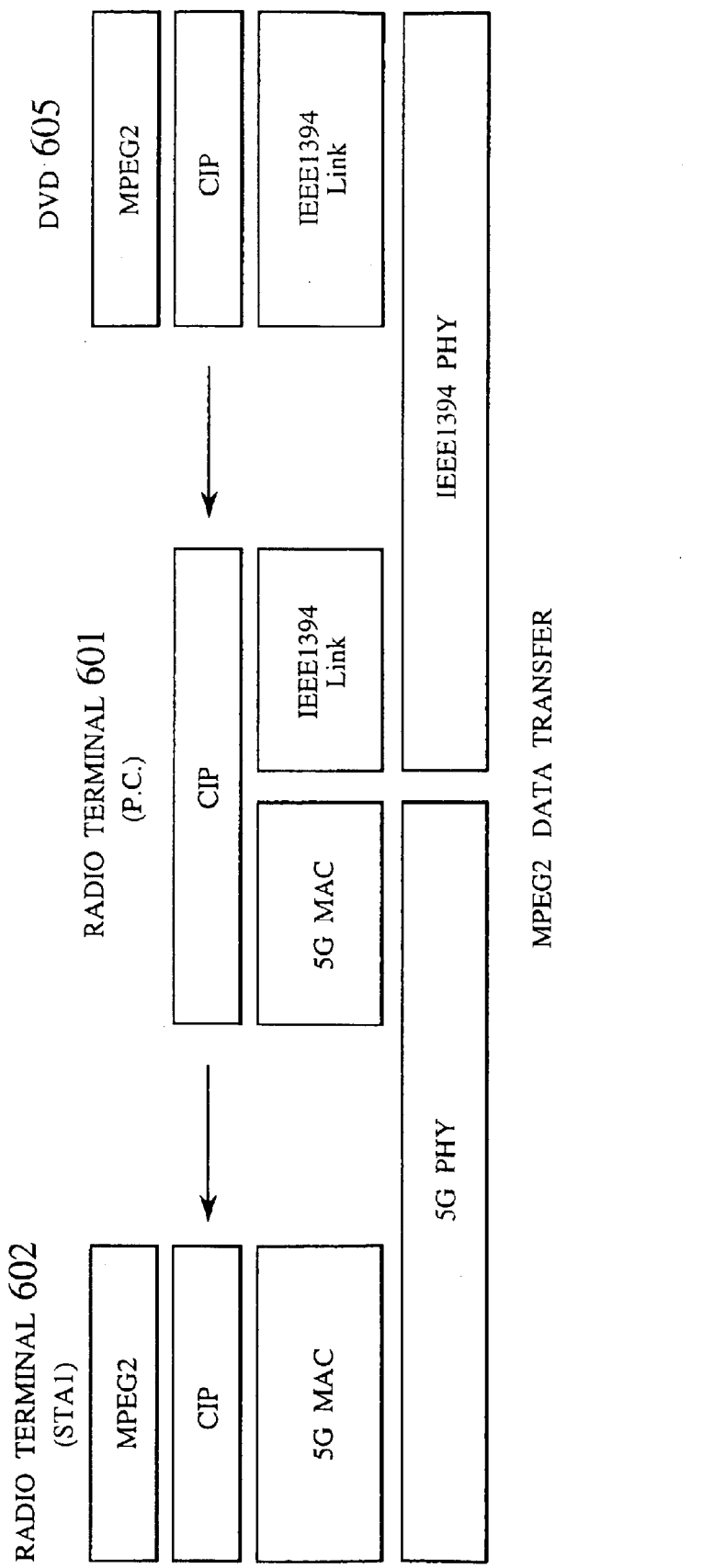
FIG. 13 is a diagram showing a protocol stack for a MPEG2 data transfer protocol used in the network system of FIG. 11.

FIG. 12 shows a protocol stack indicating how the AV/C protocol is executed in this embodiment, and FIG. 13 shows a protocol stack indicating how the actual MPEG2 data transfer is carried out in this embodiment. As can be seen from FIG. 12 and FIG. 13, the radio terminal 601 provides a function for terminating the IEEE 1394 bus protocol and connecting the IEEE 1394 bus with the 2.4 GHz band radio LAN or the 5 GHz band radio LAN at a level of an upper layer protocol (such as FCP layer in the AV/C protocol or CIP layer in the MPEG2 data transfer, for example).

In the radio network operated in this way, the processing for actually transferring the MPEG2 data on the DVD 605 to the radio terminal 602 according to a request from the radio terminal 602 is carried out as follows. This example is directed to the case where a VTR SubUnit exists in the DVD 605 on the IEEE 1394 bus, a. Display SubUnit exists in the radio terminal 602, and the MPEG2 data transfer is carried out between these SubUnits.

Figure 14:
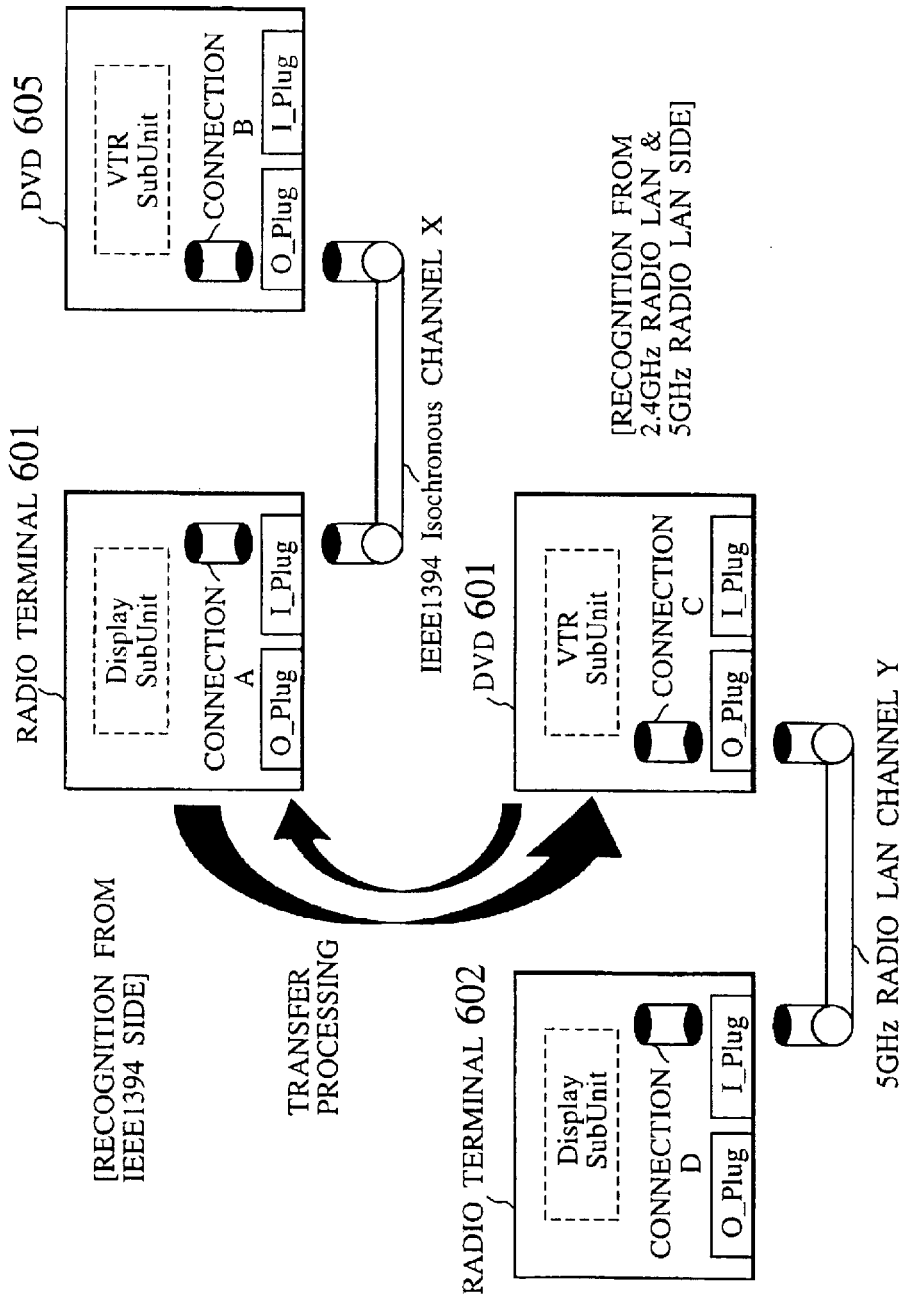
FIG. 14 is a diagram showing a network configuration as recognized by a radio terminal and a node on IEEE 1394 bus, and exemplary communication resources reserved in the network system of FIG. 11.

FIG. 14 shows how the DVD 605 and the radio terminal 602 are recognizing each other and what communication resources are reserved in executing the MPEG2 data transfer. In FIG. 14, from a viewpoint of the DVD 605, the Display SubUnit in the radio terminal 602 appears as if it is existing in the radio terminal 601, and this Display SubUnit and the VTR SubUnit is connected through an internal connection B inside the DVD 605, an isochronous channel X on the IEEE 1394 bus, and an internal connection A inside the radio terminal 601. On the other hand, from a viewpoint of the radio terminal 602, the VTR SubUnit in the DVD 605 appears as if it is existing in the radio terminal 601, and this VTR SubUnit and the Display SubUnit is connected through an internal connection D inside the radio terminal 602, a channel Y on the 5 GHz band radio LAN, and an internal connection C inside the radio terminal 601.

Here, O_Plug and I_Plug provided in the DVD 605 and the radio terminals 601 and 602 are interfaces for carrying out data transmission and reception with respect to the isochronous channel on the IEEE 1394 bus, which are defined by the ISO-IEC 61883 protocol. Also, the internal connections A, B, C and D provided in the DVD 605 and the radio terminals 601 and 602 are connections for connecting between SubUnits or between SubUnit and Plug in the 1394 nodes or the radio terminals, which are set up or released by the AV/C protocol. Thus, in order to transfer the MPEG2 data from the DVD 605 to the radio terminal 602, the transfer of the MPEG2 data will be commanded after setting up such a communication route using the ISO-IEC 61883 protocol and the AV/C protocol in the configuration of FIG. 11. The transfer command will be executed by the AV/C protocol.

Figure 15:
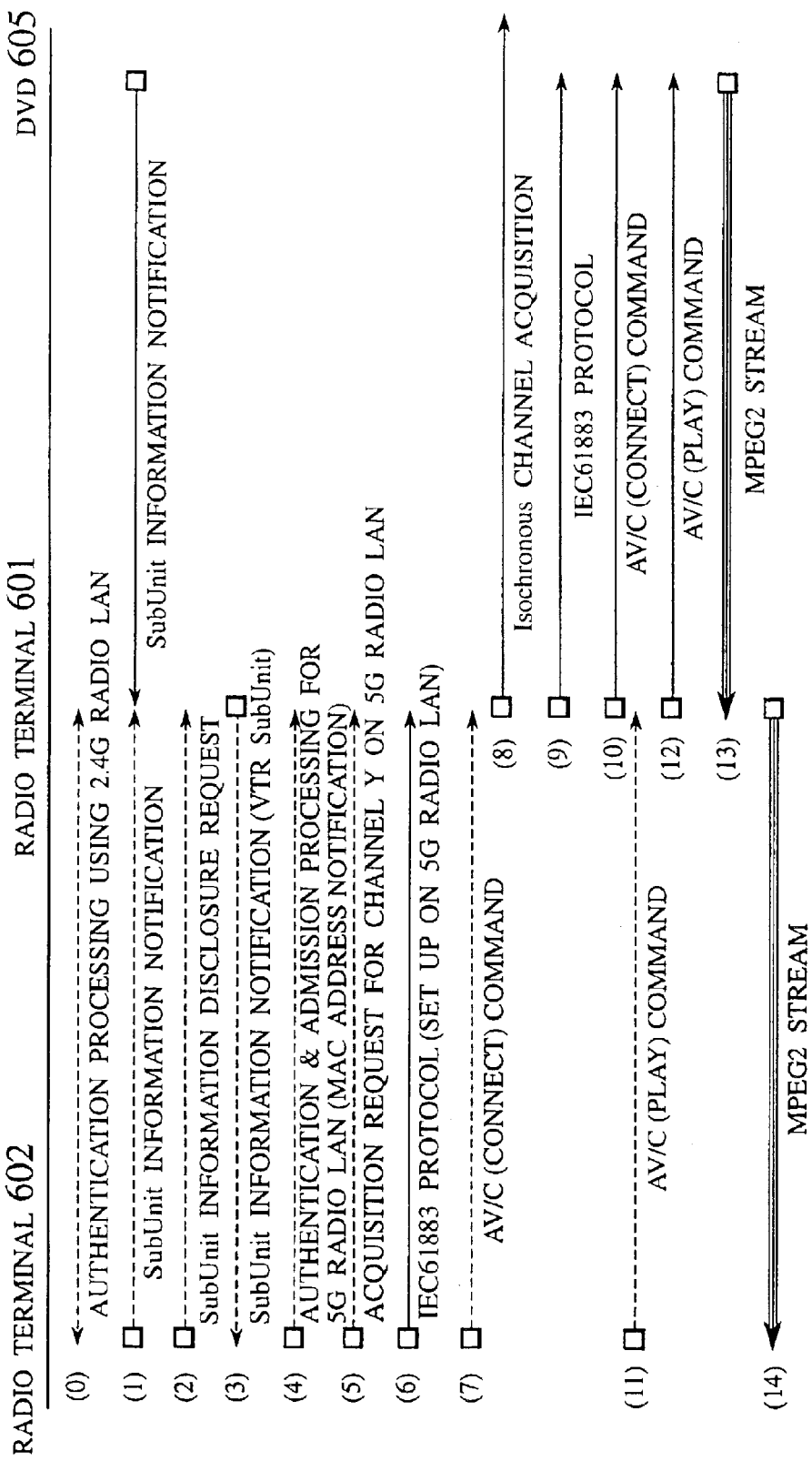
FIG. 15 is a diagram showing a processing sequence for communications among radio terminals in the network system of FIG. 11.

FIG. 15 shows an exemplary processing sequence for transferring the MPEG2 data from the DVD 605 to the radio terminal 602 after reserving communication resources as shown in FIG. 14. Here, it is assumed that the ISO-IEC 61883 protocol is executable even on the 5 GHz band radio LAN, so that the MPEG2 data communication on the 5 GHz band radio LAN is transferred through some communication channel (channel Y in FIG. 14) on the 5 GHz band radio LAN. It is also assumed that the data transfer processing is carried out by the Contention Mode of the IEEE 802.11 as the transfer protocol on the 2.4 GHz band radio LAN and the 5 GHz band radio LAN. It is also assumed that the radio terminal 602 makes a connection to the 5 GHz band radio LAN using a procedure as described in the first embodiment. This processing sequence proceeds as follows.

(0) The radio terminal 602 carries out the authentication processing with the radio terminal 601, and becomes a state in which communications using the 2.4 GHz band radio LAN are possible.

(1) The radio terminal 602 notifies information on SubUnits in the own terminal to the radio terminal 601, and the DVD 605 notifies information on SubUnits in the own node to the radio terminal 601.

(2) The radio terminal 602 requests the radio terminal 601 to disclose information on the SubUnits in the radio terminal 601.

(3) The radio terminal 601 discloses the VTR SubUnit actually existing in the DVD 605 as information on the SubUnits in the own terminal.

(4) The radio terminal 602 carries out the authentication processing for the 5 GHz band radio LAN with the radio terminal 601, via the 2.4 GHz band radio LAN, and then makes a connection to the 5 GHz band radio LAN for which the radio terminal 601 is the P.C. Here, the MAC address (=Y) used in the 2.4 GHz band radio LAN is also used as the MAC address in the 5 GHz band radio LAN.

(5) The radio terminal 602 executes a request for channel acquisition on the 5 GHz band radio LAN, via the 2.4 GHz band radio LAN (and the radio terminal 601 acquires the channel Y).

(6) The radio terminal 602 sets up a data transmission to the radio channel Y from the O_Plug in the radio terminal 601 and a data reception from the radio channel Y using the I_Plug in the own terminal, according to the ISO-IEC 61883 protocol.

(7) The radio terminal 602 transmits an AV/C command (Connect command) for connecting between the VTR Sub-Unit and the O_Plug that are recognized as existing in the radio terminal 601 by the internal connection C. At the same time, the Display SubUnit and the I_Plug in the own terminal are connected by the internal connection D.

(8) The radio terminal 601 acquires the isochronous channel X on the IEEE 1394 bus in response to the Connect command from the radio terminal 602.

(9) The radio terminal 601 sets up a data transmission to the isochronous channel X from the O_Plug In the DVD 605 and a data reception from the isochronous channel X using the I_Plug in the own terminal, according to the ISO-IEC 61883 protocol.

(10) The radio terminal 601 transmits an AV/C command (Connect command) for connecting between the VTR Sub-Unit and the O_Plug existing in the DVD 605 by the internal connection B. At the same time, the Display Sub-Unit and the I_Plug in the own terminal are connected by the internal connection A.

(11) Upon receiving the AV/C response for the Connect command, the radio terminal 602 transmits an AV/C command (Play command) to the VTR SubUnit according to the AV/C protocol.

(12) The radio terminal 601 transfers the AV/C command (Play command) transmitted with respect to the VTR SubUnit, to the DVD 605.

(13) The desired MPEG2 data are transferred from the DVD 605 to the Display SubUnit in the radio terminal 601.

(14) The radio terminal 601 transfers the transferred MPEG2 data towards the Display SubUnit of the radio terminal 602 which is the actual data transfer destination, via the 5 GHz band radio LAN.

By this series of processing, it becomes possible for the radio terminal 602 which has only a reception function with respect to the 5 GHz band radio LAN to receive the video data on the IEEE 1394 bus connected to the 5 GHz band radio LAN. In particular, it is possible to execute the communication resource processing for the purpose of transferring wideband data such as MPEG2 data and the AV control protocol necessary for the MPEG2 data transfer.

Figure 16:
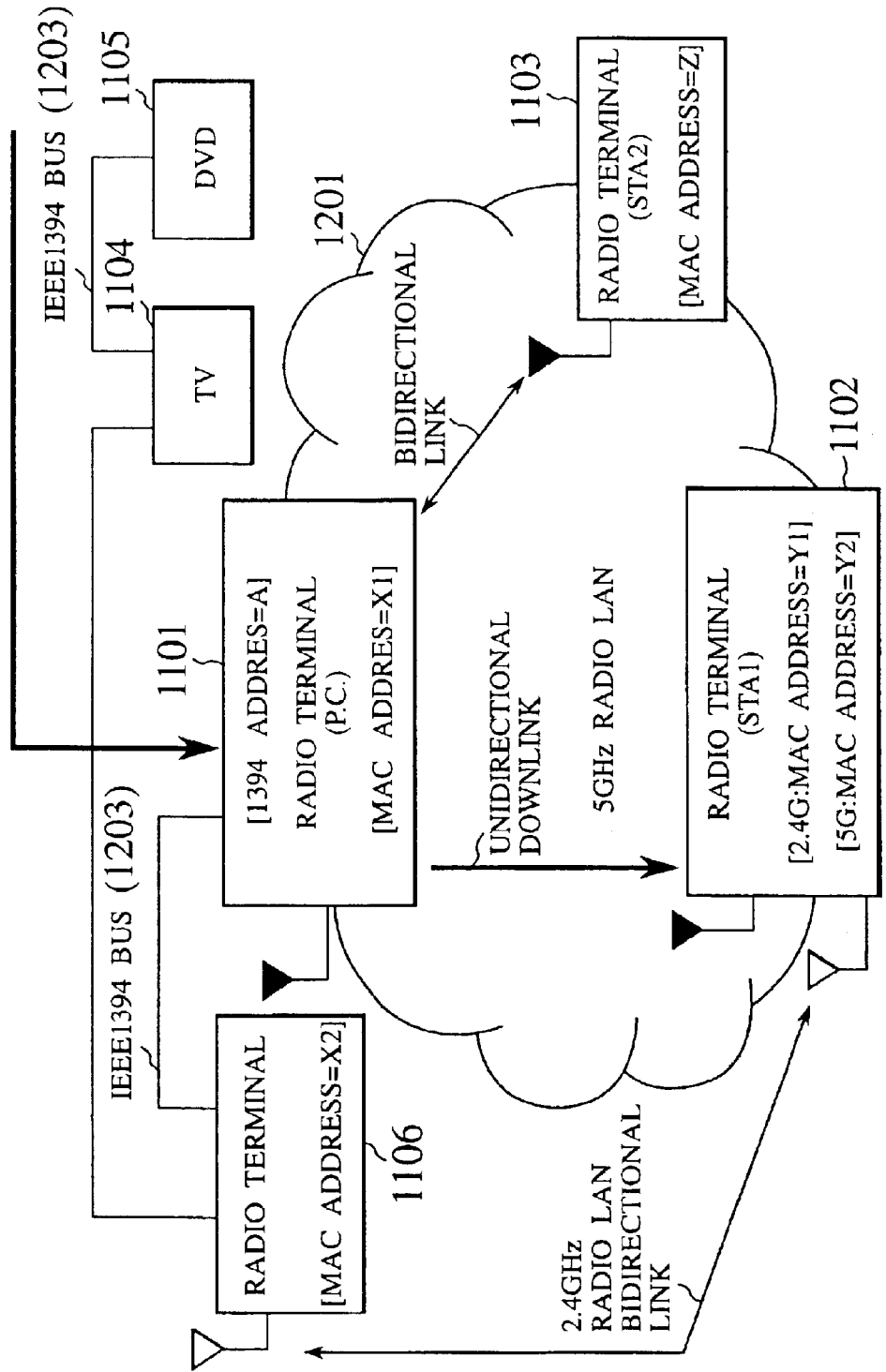
FIG. 16 is a schematic diagram showing a configuration of a network system according to the fourth embodiment of the present invention.

Referring now to FIG. 16 to FIG. 18, the fourth embodiment of a radio communication system and a radio terminal device according to the present invention will be described in detail.

This fourth embodiment is directed to the case of the radio network in which the 2.4 GHz band radio LAN and the 5 GHz band radio LAN are operated independently, where both the radio terminal providing the P.C. function on the 2.4 GHz band radio LAN and the radio terminal providing the P.C. function on the 5 GHz band radio LAN are existing on the same IEEE 1394 bus. The example described here is also directed to the case where the radio terminal on the radio network downloads image information from a DVD existing on the IEEE 1394 bus, and in particular the AV control protocol is executed between this radio terminal and the DVD via the 2.4 GHz band radio LAN, and the actual image data are received via the 5 GHz band radio LAN.

The difference between this fourth embodiment and the third embodiment is that a terminal for carrying out communications on the 2.4 GHz band radio LAN and a terminal for carrying out communications on the 5 GHz band radio LAN are different in this fourth embodiment, and that a protocol for notifying control information on the 5 GHz band radio LAN that is transmitted via the 2.4 GHz band radio LAN is executed between these terminals.

In other words, the processing (4) of FIG. 15 for making a connection to the 5 GHz band radio LAN and the processing (6) of FIG. 15 for reflecting the request for plug control processing on the 5 GHz band radio LAN according to the ISO-IEC 61883 protocol into the 5 GHz band radio LAN side that were carried out by the radio terminal 601 of FIG. 11 via the 2.4 GHz band radio LAN in the third embodiment will be executed as a communication protocol between different radio terminals. It is assumed that the w control message transfer protocol for this purpose is defined in advance.

FIG. 16 shows an exemplary configuration of a network system in this case. It is assumed that the radio LANs are operated according to the IEEE 802.11 protocol similarly as in the third embodiment. The network system of FIG. 16 includes a radio terminal 1101 which provides a P.C. function in the 5 GHz band radio LAN 1201, a radio terminal 1103 which has transmission and reception functions with respect to the 5 GHz band radio LAN, and a radio terminal 1102 which has only a reception function with respect to the 5 GHz band radio LAN. In addition, the radio terminal 1102 has transmission and reception functions with respect to the 2.4 GHz band radio LAN by which it can communicate with a radio terminal 1106. Moreover, the radio terminal 1101 and the radio terminal 1106 have interfaces with respect to the same IEEE 1394 bus 1203, and are connected to a TV 1104 and a DVD 1105 via the IEEE 1394 bus.

This embodiment is also directed to the case where the AV/C protocol to be executed between the radio terminal and the node on the IEEE 1394 bus is executed via the 2.4 GHz band radio LAN, and the MPEG2 data are actually transferred via the IEEE 1394 bus and the 5 GHz band radio LAN.

In the following, the case of transferring the MPEG2 data in the DVD 1105 to the radio terminal 1102 will be described, assuming that the AV/C protocol is executed between the radio terminal 1102 and the DVD 1105 based on the recognition of the network as shown in FIG. 14, similarly as in the third embodiment.

FIG. 17 and FIG. 18 show an exemplary processing sequence for transferring the MPEG2 data from the DVD 1105 to the radio terminal 1102 in this case. Here, it is also assumed that the ISO-IEC 61883 protocol is executable even on the 5 GHz band radio LAN. It is also assumed that the radio terminal 1102 makes a connection to the 5 GHz band radio LAN using a procedure as described in the first embodiment. This processing sequence proceeds as follows.

(0) The radio terminal 1102 carries out the authentication processing with the radio terminal 1106, and becomes a state in which communications using the 2.4 GHz band radio LAN are possible.

(1) The radio terminal 1101 notifies the 1394 interface address (=A) of the own terminal to the radio terminal 1102. Here, it is also possible for the radio terminal 1101 to broadcast the 1394 interface address of the own terminal on the 5 GHz band radio LAN.

(2) The radio terminal 1102 notifies the 1394 address (=A) of the radio terminal 1101 notified by the processing (1), to the radio terminal 1106.

(3) The radio terminal 1106 confirms that the received 1394 address (=A) exists on the IEEE 1394 bus, and makes an initial setting indicating that the control messages regarding the 5 GHz band radio LAN that will be transmitted to the own device (radio terminal 1106) thereafter are to be transferred to the radio terminal 1101.

(4) The radio terminal 1102 notifies information on SubUnits in the own terminal to the radio terminal 1106, and the DVD 1105 notifies information on SubUnits in the own node to the radio terminal 1106.

(5) The radio terminal 1102 requests the radio terminal 1106 to disclose information on the SubUnits in the radio terminal 1106.

(6) The radio terminal 1106 discloses the VTR SubUnit actually existing in the DVD 1105 as information on the SubUnits in the own terminal.

(7) When the radio terminal 1102 transmits a request for the authentication processing for the 5 GHz band radio LAN or a request for a connection (admission) to the 5 GHz band radio LAN for which the radio terminal 1101 is the P.C., to the radio terminal 1106 via the 2.4 GHz band radio LAN, the radio terminal 1106 transfers this authentication request or connection request to the radio terminal 1101, and the authentication request or the connection request of the radio terminal 1102 is processed at the radio terminal 1101. Here, the MAC address (=Y1) used in the 2.4 GHz band radio LAN can be also used as the MAC address in the 5 GHz band radio LAN.

(8) When the radio terminal 1102 transmits a request for channel acquisition on the 5 GHz band radio LAN, via the 2.4 GHz band radio LAN, the radio terminal 1106 transfers this channel acquisition request to the radio terminal 1101, and the processing for channel acquisition on the 5 GHz band radio LAN is carried out at the radio terminal 1101 (and the radio terminal 1101 acquires the channel Y).

(9) When the radio terminal 1102 transmits a request for setting up a data transmission to the radio channel Y from the O_Plug in the radio terminal 1101 according to the ISO-IEC 61883 protocol, via the 2.4 GHz band radio LAN, the radio terminal 1106 transfers this data transmission set up request to the radio terminal 1101, and the data transmission set up processing is carried out at the radio terminal 1101.

(10) The radio terminal 1102 transmits an AV/C command (Connect command) for connecting between the VTR SubUnit and the O_Plug that are recognized as existing in the radio terminal 1106 by the Internal connection C, via the 2.4 GHz band radio LAN. At the same time, the Display SubUnit and the I_Plug in the own terminal are connected by the Internal connection D.

(11) The radio terminal 1106 acquires the isochronous channel X on the IEEE 1394 bus in response to the Connect command from the radio terminal 1102.

(12) The radio terminal 1106 sets up a data transmission to the isochronous channel X from the O_Plug in the DVD 1105 and a data reception from the isochronous channel X using the I_Plug In the radio terminal 1101, according to the ISO-IEC 61883 protocol.

(13) The radio terminal 1106 transmits an AV/C command (Connect command) for connecting between the VTR SubUnit and the O_Plug existing in the DVD 1105 by the internal connection B. At the same time, the Display SubUnit and the I_Plug in the own terminal are connected by the internal connection A.

(14) The DVD 1105 carries out the processing corresponding to the AV/C command transmitted by (13), and then returns an AV/C response for notifying the processing result. This AV/C response is transferred from the radio terminal 1106 to the radio terminal 1102 via the 2.4 GHz band radio LAN.

(15) The radio terminal 1106 transmits an AV/C command (Connect command) for connecting between the O_Plug and the I_Plug in the radio terminal 1101.

(16). The radio terminal 1101 carries out the processing corresponding to the Av/C command transmitted by (15), and then returns an AV/C response for notifying the processing result.

(17) Upon receiving the AV/C response for the Connect command transmitted by (10), via the 2.4 GHz band radio LAN, the radio terminal 1102 transmits an AV/C command (Play command) to the VTR SubUnit that is recognized as existing in the radio terminal 1106.

(18) The radio terminal 1106 transfers the AV/C command (Play command) transmitted with respect to the VTR SubUnit, to the DVD 1105.

(19) The DVD 1105 carries out the processing corresponding to the AV/C command transmitted by (18), and then returns an AV/C response for notifying the processing result. This AV/C response is transferred from the radio terminal 1106 to the radio terminal 1102 via the 2.4 GHz band radio LAN.

(20) The desired MPEG2 data are transmitted from the DVD 1105 onto the isochronous channel X.

(21) The radio terminal 1101 receives data on the isochronous channel X and transfers this data to the channel Y on the 5 GHz band radio LAN, such that the received MPEG2 data are transmitted towards the Display SubUnit in the radio terminal 1102 which is the actual data transfer destination, via the 5 GHz band radio LAN.

By this series of processing, it becomes possible for the radio terminal 1102 which has only a reception function with respect to the 5 GHz band radio LAN to receive the video data on the IEEE 1394 bus connected to the 5 GHz band radio LAN. In particular, even when the 2.4 GHz band radio communication function and the 5 GHz band radio communication function are existing independently on the IEEE 1394 bus, it is possible to carry out the control and the set up of the 5 GHz band radio LAN via the 2.4 GHz band radio LAN using the initial setting between the 2.4 GHz band radio communication function and the 5 GHz band radio communication function. Moreover, it is possible to execute the communication resource processing for the purpose of transferring wideband data such as MPEG2 data and the AV control protocol necessary for the MPEG2 data transfer.

As described above, according to the present invention, in a network in which at least a first network and a second network are used (a home network in which the 2.4 GHz band radio LAN and the 5 GHz band radio LAN are used, for example), a terminal device (a radio terminal, for example) which is capable of packet transmission and reception in the second network but which is capable only of packet reception in the first network can carry out a procedure necessary in receiving data through the first network by utilizing the second network, so that this terminal device can be effectively utilized as a packet receiving node in the first network without transmitting any packet to the first network from this terminal device (that is, without requiring a packet transmission function with respect to the first network in this terminal device).

Thus according to the present invention, it becomes possible to transfer information to a radio terminal having a transmission and reception interface for the 2.4 GHz band radio LAN and a reception interface for the 5 GHz band radio LAN from another radio terminal on the 5 GHz band radio LAN, for example.

In addition, It is also possible to transmit various data transferred on the other non-radio network such as the IEEE 1394 bus, for example, by relaying the data transfer at another radio terminal having a transmission and reception interface for the 5 GHz band radio LAN, so that it becomes possible to realize the data communications as if it is connected to the IEEE 1394 bus through a radio interface.

Namely, even when the radio terminal has only a reception function with respect to the 5 GHz band radio LAN, the authentication/admission processing in the 5 GHz band radio LAN or the AV control protocol between the radio terminal and the node on the IEEE 1394 bus can be carried out via the 2.4 GHz band radio LAN, and the actual data transfer can be carried out via the 5 GHz band radio LAN, so that the video data on the IEEE 1394 bus can be received through the 5 GHz band radio interface.

Consequently, according to the present invention, it is possible to reduce the cost of the radio terminal using expensive components for the 5 GHz band radio communication, for example. In particular, by providing only a reception function among the radio communication function, and utilizing an inexpensive radio system for the bidirectional communications, it is possible to reduce the number of expensive radio components that are required in the terminal, and thereby reduce the cost of the terminal.

Note that the video information utilization in the home is mostly in a form of receiving/displaying video transmitted by a TV or satellite broadcast for the purpose of watching broadcast programs. This implies that the most users are likely to only receive the video information and hardly transmit any video information. In view of this fact, it is effective to provide only a reception function in the terminal in order to realize wider spread of the 5 GHz band radio function to many homes at low cost. Thus, by providing only a reception function as an expensive radio function such as the 5 GHz band radio function while also providing a transmission function using another inexpensive radio function such as the 2.4 GHz band radio function, It is possible to provide radio terminals that can receive wideband image data and that can be easily accepted in the home environment.

It is to be noted that the above embodiments have been described for an exemplary case of using the IEEE 1394 bus as a network other than the radio network, but the present invention is equally applicable to the case of using a network other than the IEEE 1394 bus in conjunction with the radio network.

It is also to be noted that the above embodiments have been described for an exemplary case of the home network, but the present invention is equally applicable to a network other than the home network.

It is also to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, each of the radio terminals of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMS. EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A communication system, comprising:
   a first terminal device connected to first and second networks, having only a reception function with respect to the first network and transmission and reception functions with respect to the second network, the first network being a radio network according to IEEE 802.11 and the second network being a radio network slower than the first network;
   a second terminal device connected to the first network and a third network different from the first and second networks, having at least a transmission function with respect to the first network and transmission and reception functions with respect to the third network;
   a third terminal device connected to the second and third networks, having transmission and reception functions with respect to the second and third networks; and
   a fourth device provided on the third network, having transmission and reception functions with respect to the third network;
   wherein the first terminal device carries out a prescribed procedure required in using the first terminal as a receiving side in the first network, by carrying out communications with the third terminal device through the second network;
   the third terminal device carries out the prescribed procedure by carrying out communications with the second terminal device through the third network;
   the third terminal device carries out another prescribed procedure required in relaying packets transferred from the fourth device towards the first terminal device at the second terminal device, by transferring a control information received from the first terminal device through the second network, to the second terminal device through the third network;
   the first terminal device transmits a packet transmission request with respect to the fourth device, to the third terminal device through the second network;
   the third terminal device transfers the packet transmission request received from the first terminal device, to the fourth device through the third network;
   the fourth device transmits packets in response to the packet transmission request received from the third terminal device, to the second terminal device through the third network; and
   the second terminal device transfers the packets received from the fourth device, to the first terminal device through the first network.

2. A method of packet transfer in a communication system including a first terminal device connected to first and second networks, having only a reception function with respect to the first network and transmission and reception functions with respect to the second network, the first network being a radio network according to IEEE 802.11 and the second network being a radio network slower than the first network, a second terminal device connected to the first network and a third network different from the first and second networks, having at least a transmission function with respect to the first network and transmission and reception functions with respect to the third network, a third terminal device connected to the second and third networks, having transmission and reception functions with respect to the second and third networks, and a fourth device provided on the third network, having transmission and reception functions with respect to the third network, the method comprising the steps of:

carrying out a prescribed procedure required in using the first terminal as a receiving side in the first network, by carrying out communications between the first terminal device and the third terminal device through the second network;

carrying out the prescribed procedure by carrying out communications between the third terminal device and the second terminal device through the third network;

carrying out another prescribed procedure required in relaying packets transferred from the fourth device towards the first terminal device at the second terminal device, by transferring a control information received from the first terminal device through the second network, from the third terminal device to the second terminal device through the third network;

transmitting a packet transmission request with respect to the fourth device, from the first terminal device to the third terminal device through the second network;

transferring the packet transmission request received from the first terminal device, from the third terminal device to the fourth device through the third network;

transmitting packets in response to the packet transmission request received from the third terminal device, from the fourth device to the second terminal device through the third network; and transferring the packets received from the fourth device, from the second terminal device to the first terminal device through the first network.

\* \* \* \* \*